(12) United States Patent
Koike

(10) Patent No.: US 6,823,410 B2
(45) Date of Patent: Nov. 23, 2004

(54) SPLIT TRANSACTION BUS SYSTEM

(75) Inventor: Tsuneo Koike, Tokyo (JP)

(73) Assignee: NEC Electronics Corporation, Kanagawa (JP)

(*) Notice: Subject to any disclaimer, the term of this patent is extended or adjusted under 35 U.S.C. 154(b) by 391 days.

(21) Appl. No.: 10/103,337

(22) Filed: Mar. 21, 2002

(65) Prior Publication Data

US 2002/0147871 A1 Oct. 10, 2002

(30) Foreign Application Priority Data

Apr. 4, 2001 (JP) ........................................ 2001/105653

(51) Int. Cl.[7] ........................... G06F 13/00; G06F 12/00
(52) U.S. Cl. ..................... 710/107; 710/309; 710/240
(58) Field of Search ................................ 710/107, 117, 710/118, 124, 125, 309, 240

(56) References Cited

U.S. PATENT DOCUMENTS 5,303,382 A * 4/1994 Buch et al. ................. 710/244
5,502,824 A * 3/1996 Heil ............................ 710/113
5,533,204 A * 7/1996 Tipley ........................ 710/108
5,845,096 A * 12/1998 Munguia et al. ............ 710/113

FOREIGN PATENT DOCUMENTS

| JP | 8-263428 | * 10/1996 |
| JP | 11-25035 | * 1/1999 |
| JP | 2000-35943 | * 2/2000 |

* cited by examiner

*Primary Examiner*—Tim Vo
(74) *Attorney, Agent, or Firm*—Scully, Scott, Murphy & Presser

(57) ABSTRACT

To advance a read response in a split transaction bus system. An access time prediction circuit 5 measures an elapsed time from a time when a read command is issued, and outputs a parking indication PI to a slave device to be read during the last clock cycle before a predicted access time Tac elapses. When receiving the parking indication PI, an arbiter 4 parks the slave device to be read by transmitting a bus grant thereto under the control of a parking control unit 6 unless a bus 1 is being used, and places the parked slave device to be read at the highest priority.

15 Claims, 20 Drawing Sheets

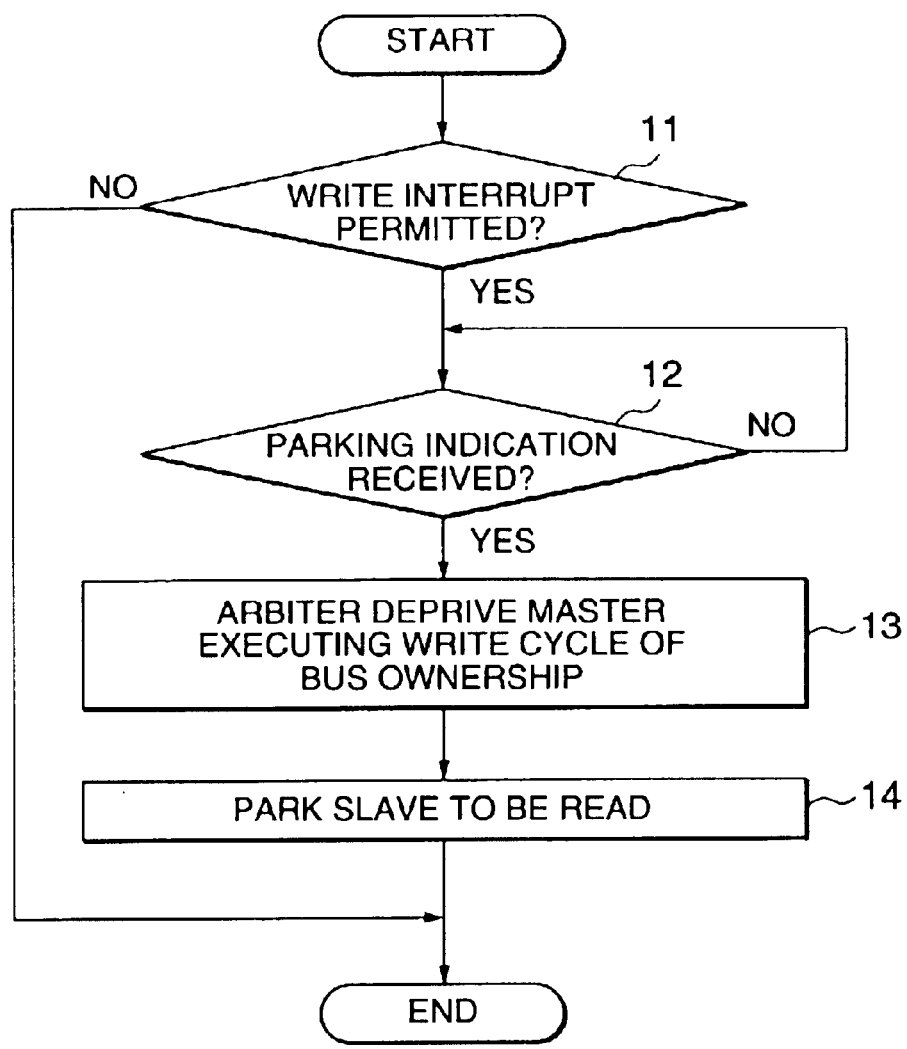

SPLIT TRANSACTION BUS SYSTEM

BACKGROUND OF THE INVENTION

1. Field of the Invention

The present invention relates to a split transaction bus system, in particular, to a split transaction bus system having an improved read response speed.

2. Description of the Prior Art

In an information processing system in which a bus is shared among a plurality of devices, an arbiter is generally provided to arbitrate among the plurality of devices each requesting a bus ownership. In the case of a legacy bus, a device serving as a master transmits a bus request to the arbiter, receives a bus grant from the arbiter, and then start using the bus to conduct a write or read to or from a slave device. When the bus requests from two or more devices compete each other, a priority device is selected according to a preset priority logic, and the bus grant is transmitted thereto. A typical priority logic used is a scheme in which the priority is fixed or round robin scheduling in which the priority is changed for every arbitration. The master device having received the bus ownership transmits a read or a write command to a slave device via the bus, and then data is read from the slave device or written to the slave device. The master device occupies the bus during the period between the transmission of the command and the completion of the read or write. In the case of read, in particular, the bus is not released during a time required for data access in the slave device. In the case where a processor serving as the master device sends the read request to a memory serving as the slave device, the data is likely to be one immediately needed by the processor for processing, so that, in one aspect, it is advantageous to wait for the read response while occupying the bus. In another aspect, however, since another master device cannot use the bus if the slave device needs a long access time, a problem arises in that the utilization ratio of the bus is reduced.

For improving the utilization ratio of the bus, a split transaction bus is known. The split transaction bus allows the slave device to request the bus ownership from the arbiter. When the bus request from the master device is the request for read, the master device receives the bus grant from the arbiter, issues the read command to the bus, and then releases once the bus. The slave device, which has received the read command, transmits the bus request to the arbiter when the data is ready for output after a lapse of the access time.

FIG. 1A is, an operation timing chart for a conventional split transaction bus. Two master devices and two slave devices are connected to the split transaction bus, and the bus ownership is arbitrated by the arbiter. Assume that, at a time t1, a bus request REQ(M1) from a first master device and a bus request REQ(M2) from a second master device are simultaneously issued. The arbiter determines to give the bus grant to the first master device according to a priority logic. At a time t2, the first master device receives the bus grant GNT(M1). At a time t3, the first master device issues a read command RR for a first slave device to the bus. After issuing the read command RR, the first master device releases the bus ownership at a time t4. The arbiter transmits a bus grant GNT(M2) to the second master device, which continuously transmits the bus request REQ(M2) . At a time t5, the second master device issues a write command WR for the second slave device to the bus. The second master device starts transferring write data WD at a time t6, completes a write cycle at a time t8, and then releases the bus ownership.

After a lapse of 5 clock cycles, which is equivalent to the read access time for the read command RR from the first master device, the first slave device transmits a bus request REQ(S1) for the read response to the arbiter at a time t9. At a time t10, the arbiter transmits the bus grant GNT(S1) to the first slave device. At a time t11, the first slave device starts transferring the read data RD to the first master device via the bus.

As described above, since in the split transaction bus, the first master device having made the read request releases the bus after issuing the read command RR, the second master device can use the bus during the access time of the first slave device, and therefore, the utilization ratio of the bus is improved.

However, in the first conventional split transaction bus, read data acquisition by the master device may be significantly delayed when the bus request for the read response and the bus request for block write or burst write for write-transferring a plurality of pieces of data compete each other. This problem will be described with reference to the operation timing chart shown in FIG. 1B. The operation from the time t1 to t8 is the same as that shown in FIG. 1A. Assume that the second master device transmits the bus request REQ(M2) to the arbiter at a time t9, the bus request REQ(M2) competes with the bus request REQ(S1) for the read response from the first slave device, and the arbiter transmits the bus grant GNT(M2) to the second master device. In response to the bus grant, at a time t11, the second master device issues the write command WR to the second slave device, and then at a time t12, transfers the write data WD. Since the bus is occupied during the period from the time t11 to t13, the start of transfer of the read data RD from the first slave device is delayed to a time t14.

A second conventional arbitration method for the split transaction bus having solved this problem is described in Japanese Patent Laid-Open No. 8-263428. In this second conventional method, the arbiter gives the bus ownership in response to the bus request by priority unless the bus is being used. According to this method, the time between the transmission of the bus request from the slave device and the output of the read data RD to the bus can be reduced. In the case where the second conventional method is applied, as shown in an operation timing chart of FIG. 2, the arbiter issues the bus grant GNT(S1) to the slave device at the time t10, so that transfer of the read data RD is started as the time t11. At the time t13 after the transfer of the read data RD is completed, the bus grant GNT(M2) in response to the bus request REQ(M2) from the second master device is issued, and at a time t14, the second master device outputs the write command WR to the bus.

In this second conventional method also, however, when competition with the bus request from another master device occurs, the time period for transmitting the bus grant from the time t10 to t11, that is, an arbitration cycle is required, and thus there is yet room for improvement.

As a technique of reducing an overhead required for switching the bus grant, a system based on,a legacy bus system and having a parking function of previously transmitting the bus grant to a particular master device added thereto is known. As for the parking, a bus system capable of designating a default owner, to which the bus ownership is given by default when no master device uses the bus, that is, the bus is in a free state (idle state), is described in Japanese Patent Laid-Open No. 11-25035. In addition, in Japanese Patent Laid-Open No. 2000-35943, there is described a technique of analyzing a predetermined number of the last transactions for the master devices to determine one using the bus most frequently as the master device to be parked.

In the legacy bus system, however, only the master devices can transmit the bus request and acquire the bus grant. Even in the case of the system having the parking function, such as techniques described in Japanese Patent Laid-Open Nos. 11-25035 and 2000-35943, the target of the parking is limited to the master devices. Therefore, although it is possible to indirectly improve the read response by applying these techniques to advance the issue of the read command from the master device, it is impossible to directly improve the read response from the slave device. In addition, even if the well-known parking function is applied to the split transaction bus, since the only the master devices can be the target of the parking, the arbitration cycle is still required for the transaction for the read response, and the read response cannot be directly improved.

Although the split transaction bus may be configured to park the slave device, which is a target of the read, immediately after the read command is issued, in such a case, the master device cannot be parked after the read command is issued. Therefore, in the case where another bus request from another master device is received during the period between the issue of the read command and the transmission of the bus request from the slave device, which is the target of the read, the arbitration cycle for the arbiter is required to cancel the parking and issue the bus grant to the master device. In addition, once the bus ownership is passed to another master device, the parking of the slave device is cancelled. Thus, the arbitration cycle for the arbiter occurs also for a subsequent read response from the slave device, so that the parking of the slave device after the read command is issued goes for nothing.

SUMMARY OF THE INVENTION

The present invention is devised in view of such a circumstance, and an object of this invention is to provide a split transaction bus system having an improved parking function, an improved read response speed, and reduced occurrence of an arbitration cycle.

In order to attain the object, a split transaction bus system according to this invention comprises: a bus that is a data transfer path for a plurality of devices; two or more master devices connected to the bus and each having an output terminal for a bus request and an input terminal for a bus grant; one or more slave devices connected to the bus and each having an output terminal for a bus request and an input terminal for a bus grant; an access time prediction circuit that predicts an access time required for the data in the slave device to be read to be ready for output when a read command is issued from one of the master devices to one of the slave devices, measures an elapsed time based on a count of clock signals, and sends a parking indication to the slave device to be read during the last cycle before the predicted access time; and an arbiter having an input terminal for the bus request from the master device and the slave device and an output terminal for the bus grant to the master device and the slave device, and provided with an arbitration function of selecting the device to which a bus ownership is given in response to the bus request thereof and transmitting the bus grant thereto, and a parking control function of parking the slave device to be read by transmitting the bus grant to the slave device to be read unless the bus is being used when the parking indication is received, as well as placing the slave device to be read at the highest priority in the arbitration.

According to another aspect of this invention, the split transaction bus comprises: a bus that is a data transfer path for a plurality of devices; two or more master devices connected to the bus and each. having an output terminal for a bus request and an input terminal for a bus grant; one or more slave devices connected to the bus and each having an output terminal for a bus request and an input terminal for a bus grant; an access time prediction circuit that predicts an access time required for the data in the slave device to be read to be ready for output when a read command is issued from one of the master devices to one of the slave devices, measures an elapsed time based on a count of clock signals, and sends a parking indication to the slave device to be read during the last cycle before the predicted access time; and an arbiter having an input terminal for the bus request from the master device and the slave device and an output terminal for the bus grant to the master device and the slave device, and provided with an arbitration function of selecting the device to which a bus ownership is given in response to the bus request thereof and transmitting the bus grant thereto, and a parking control function of parking the slave device to be read by, if the bus is not being used when the parking indication is received, transmitting the bus grant to the slave device to be read, and if write is being executed, depriving the master device of the bus ownership and transmitting the bus grant to the slave device to be read, as well as placing the slave device to be read at the highest priority in the arbitration.

According to another aspect of this invention, the split transaction bus comprises: a bus that is a data transfer path for a plurality of devices; two or more master devices connected to the bus and each having an output terminal for a bus request and an input terminal for a bus grant; one or more slave devices connected to the bus and each having an output terminal for a bus request and an input terminal for a bus grant; an access time prediction circuit that predicts an access time required for the data in the slave device to be read to be ready for output when a read command is issued from one of the master devices to one of the slave devices, measures an elapsed time based on a count of clock signals, and sends a parking indication to the slave device to be read during the last cycle before the predicted access time; and an arbiter having an input terminal for the bus request from the master device and the slave device, an output terminal for the bus grant to the master device and the slave device and a connection terminal to the bus, and provided with an arbitration function of selecting the device to which a bus ownership is given in response to the bus request thereof and transmitting the bus grant thereto, and a parking control function of parking the slave device to be read by, if the bus is not being used when the parking indication is received, transmitting the bus grant to the slave device to be read, and if write is being executed, calculating, based on information of the read command and the write command received from the bus, the number of clock cycles required for completing a write process at the time when the predicted access time elapses and the number of clock cycles required for data read from the slave device to be read, and comparing the numbers with each other, and when the former number is equal to or more than the latter number, depriving the master device of the bus ownership and transmitting the bus grant to the slave device to be read, as well as placing the slave device to be read at the highest priority in the arbitration.

These and other objects and features of this invention will be apparent from the description with reference to the drawings and the new matters as set forth in the claims.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 13 is a flowchart illustrating an operation of parking control by the arbiter according to the seventh embodiment;

DETAILED DESCRIPTION OF THE PREFERRED EMBODIMENTS

Now, preferred embodiments of the present invention will be described in detail with reference to the appended drawings. The following description is only illustrative, and this invention should not be construed as being limited thereto.

Figure 3:
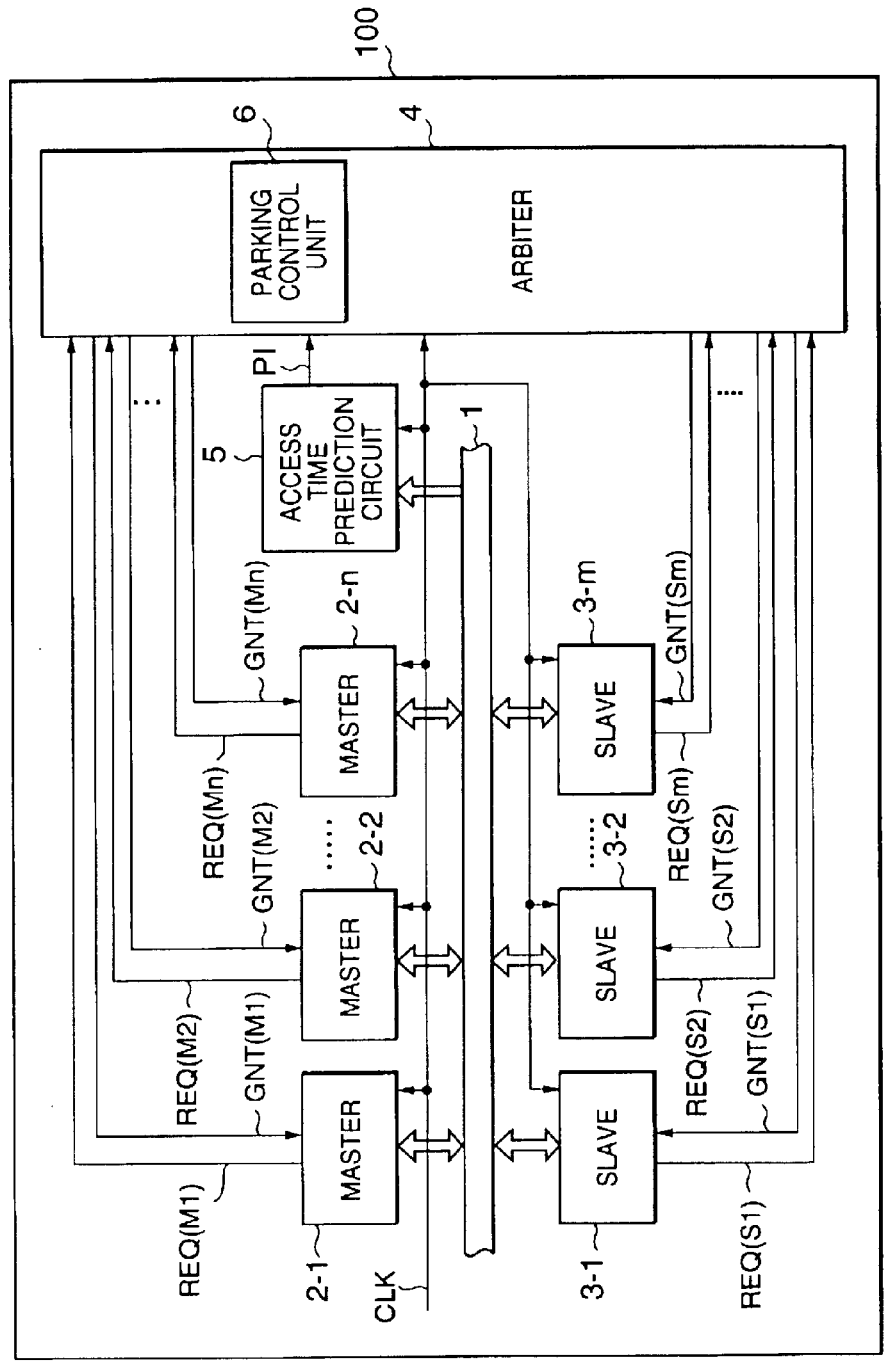
FIG. 3 is a block diagram illustrating a first embodiment of a split transaction bus system according to this invention.

FIG. 3 is a block diagram of a bus system 100 according to a first embodiment of this invention. The bus system 100 shown in FIG. 3 is a bus system based on a split transaction method, in which n (n≧2) master devices 2-1 to 2-n and 1 m (m≧1) slave devices 3-1 to 3-m are connected to a bus 1. The master device 2-1 transmits a bus request REQ(M1) to an arbiter 4, receives a bus grant GNT(M1), and thus acquires an ownership of the bus 1. The master device 2-2 transmits a bus request REQ(M2) to the arbiter 4, receives a bus grant GNT(M2), and thus acquires the ownership of the bus 1. Similarly, the master device 2-n transmits a bus request REQ(Mn) to the arbiter 4, receives a bus grant GNT (Mn), and thus acquires the ownership of the bus 1. Furthermore, the slave device 3-1 transmits a bus request REQ(S1) to the arbiter 4, receives a bus grant GNT(S1), and thus acquires the ownership of the bus 1. The slave device 3-2 transmits a bus request REQ(S2) to the arbiter 4, receives a bus grant GNT(S2), and thus acquires the ownership of the bus 1. Similarly, the slave device 3-m transmits a bus request REQ(Sm) to the arbiter 4, receives a bus grant GNT(Sm), and thus acquires the ownership of the bus 1. The arbiter 4 transmits the bus grant when it receives the bus request from any of the master devices 2-1 to 2-n and the slave devices 3-1 to 3-m. When the bus requests from two or more devices compete each other, the arbiter 4 selects a priority device according to a preset priority logic and transmits the bus grant thereto. In addition, the arbiter 4 includes a parking control unit 6 for conducting control of parking.

An access time prediction circuit 5 predicts the access time of the slave device to be read based on the information acquired through the bus 1 and, according to the predicted access time Tac, sends a parking indication PI to the slave device to be read during the last clock cycle before the bus request is transmitted. The "access time of the slave device" herein refers to the time required for the data stored at an address accessed in the slave device to be ready for transfer. The parking control unit 6 controls the arbiter 4 so as to continuously transmit the bus grant to the slave device to be read, that is, park that slave device when it receives the parking indication PI.

In the case of read, the master device having acquired the bus ownership issues a read command to the slave device to be read via the bus 1, the read command including information such as a name of the slave device to be read, an address from which the read is started, the number of pieces of read data. In the case of write, the master device having acquired the bus ownership issues a write command to the slave device to be written via the bus 1, the write command including information such as a name of the slave device to be written, an address from which the write is started, the number of pieces of write data. As for the split transaction bus, in the case of read, after a lapse of a predetermined access time of the slave device to be read from the issue of the read command, the bus request from the slave device to be read is transmitted to the arbiter 4. In the bus system 100, the following three steps are performed before the above operation. That is, first, the elapsed time from the issue of the read command is measured by counting the clock cycles, and the parking indication PI including the name of the slave device to be read is sent to the arbiter 4 from the access time prediction circuit 5 during the last clock cycle before the predicted access time Tac elapses. Then, unless the bus 1 is being used, in response to the parking indication PI, the arbiter 4 parks the slave device to be read by transmitting the bus grant thereto under the control of the parking control unit 6. At the same time, the arbiter 4 places the parked slave device at the highest priority to ensure that the bus grant is issued to the slave device even if competition of the bus requests occurs.

Figure 4:
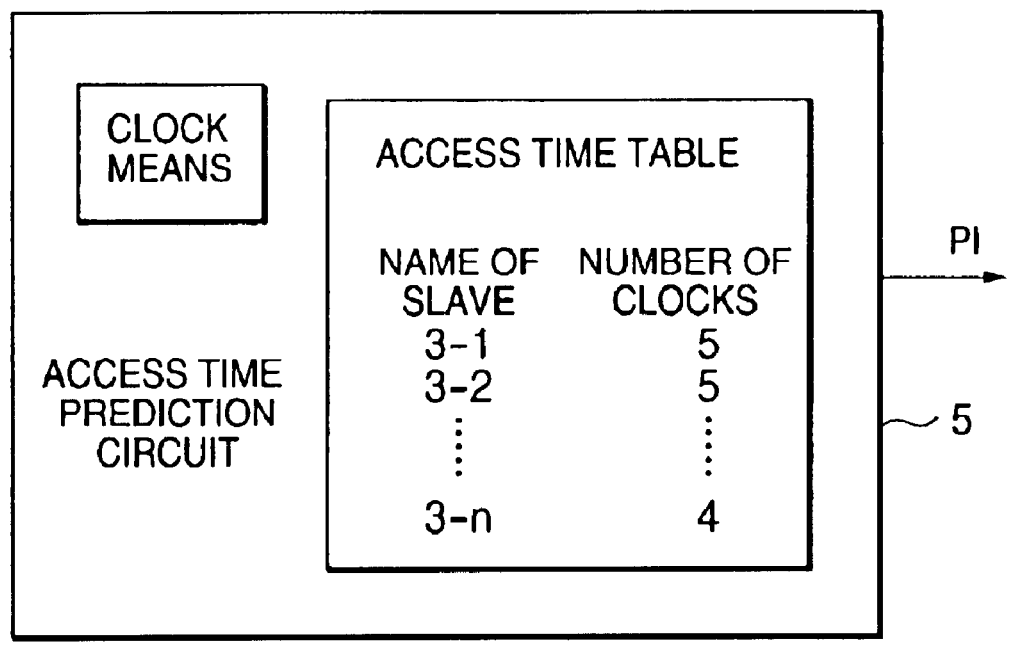
FIG. 4 shows a configuration of an access time prediction circuit according to the first embodiment, the access time prediction circuit including a table of data access times for the respective slave devices.

The access time prediction circuit 5 predicts the access time of the slave device to be read based on the information acquired via the bus 1, measures the elapsed time from the issue of the read command with internal clock means, and sends the parking indication PI to the arbiter 4 during the last clock cycle before the predicted access time Tac elapses. In the bus system 100, as shown in FIG. 4, the access time prediction circuit 5 comprises, besides the clock means, an access time table of the names of the slave devices to be read and the respective typical numbers of clock cycles (that is, the predicted access times Tac) associated with each other. The access time prediction circuit 5 monitors the information delivered through the bus 1, reads the name of the slave device to be read from the read command when it detects the issue of the read command from the master device, and refers to the access time table to fetch the predicted access time Tac associated with the name. Then, the access time prediction circuit 5 sets the clock means at the number of clock cycles (for example, 5 clock cycles) associated with the predicted access time Tac, counts down the clock cycle every rise thereof, and when the number of remaining clock cycles becomes 1, sends the parking indication PI including the name of the slave device to be read to the parking control unit 6 in the arbiter 4.

Figure 1A:
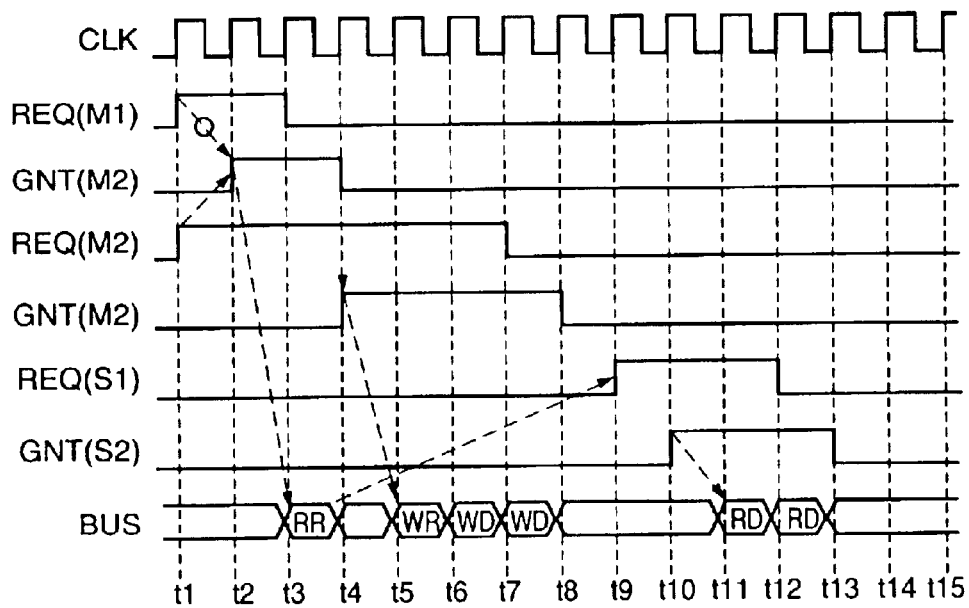
FIG. 1A is a timing chart illustrating an operation in a conventional split transaction bus when a competition does not occur at a time t9.
Figure 1B:
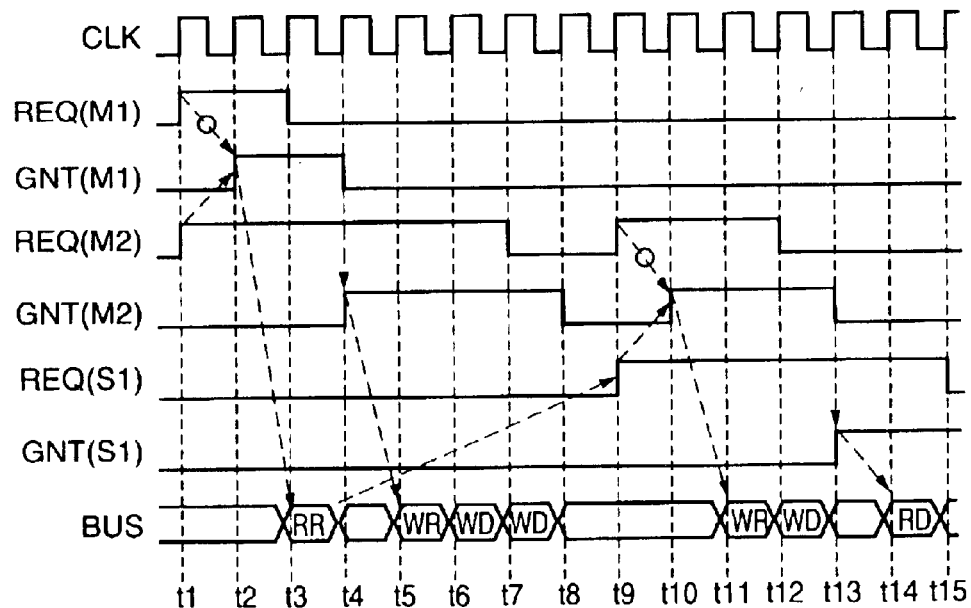
FIG. 1B is a timing chart illustrating an operation in the conventional split transaction bus when a bus request from a slave device and a bus request from a master device compete each other at a time t9.
Figure 2:
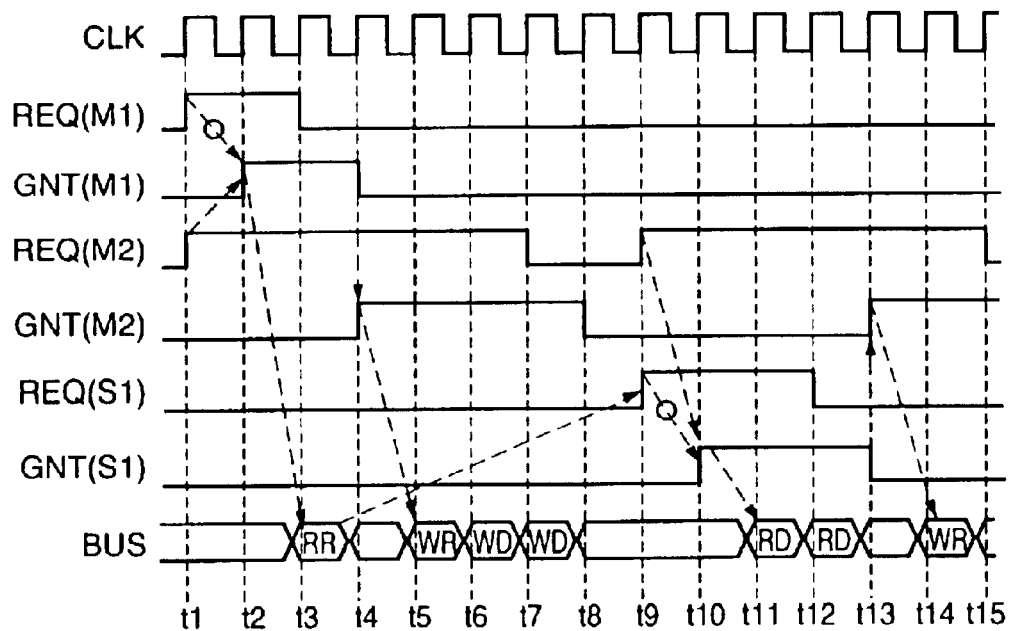
FIG. 2 is a timing chart illustrating an operation in a second conventional split transaction bus when a bus request from a slave device and a bus request from a master device compete each other at a time t9.
Figure 5:
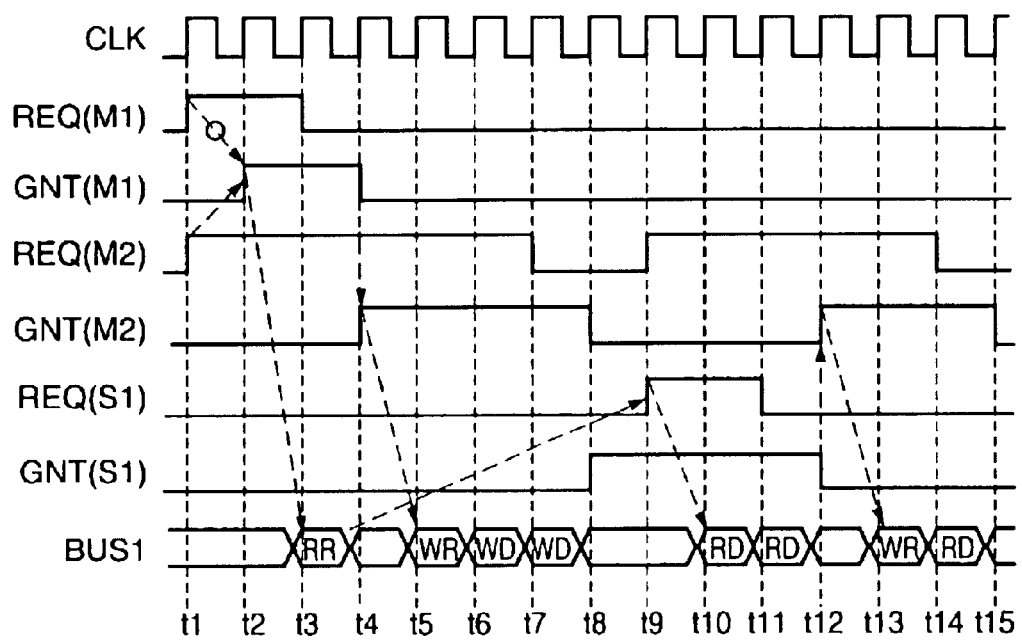
FIG. 5 is a timing chart illustrating an operation of the bus system according to the first embodiment.

FIG. 5 is a timing chart illustrating an operation of the bus system 100 according to the first embodiment. Now, the operation of the bus system 100 will be described with reference to the operation timing chart shown in FIG. 5. As in FIGS. 1B and 2, at a time t1, the bus request REQ(M1) and the bus request REQ(M2) are transmitted to the arbiter 4 from the master device 2-1 and the master device 2-2, respectively, and the arbiter determines the master device 2-1 as the target of the bus grant according to the priority logic. At a time t2, the master device 2-1 receives the bus grant GNT(M1) from the arbiter 4, and at a time t3, the read command RR for the slave device 3-1 is output to the bus 1. After issuing the read command RR, the master device 2-1 releases the bus ownership at a time t4. The arbiter 4 transmits the bus grant GNT(M2) to the master device 2-2, which continuously transmits the bus request REQ(M2). The master device 2-2 receives the bus grant GNT(M2), and at a time t5, outputs the write command WR for the slave device 3-2 to the bus 1. The master device 2-2 starts transferring the write data WD at a time t6 to conduct write to the slave device 3-2, completes the write cycle at a time t8, and then releases the bus ownership. The operation so far is the same as that illustrated in FIGS. 1B and 2.

The access time prediction circuit 5 reads the name of the slave device to be read from the read command delivered through the bus 1 during the period from a time t3 to t4, and fetches the predicted access time Tac associated with the name of the slave device to be read by referring to the access time table. Then, the access time prediction circuit 5 measures the elapsed time, and sends the parking indication PI to the arbiter 4 at a time t8, which is one clock cycle before the predicted access time Tac elapses. At the time t8, in Response to the parking indication, the parking control unit 6 in the arbiter 4 controls parking, so that the arbiter 4 transmits the bus grant GNT(Sl) to the slave device 3-1, thereby parking the slave device 3-1, which is the slave device to be read. Besides, the arbiter 4 makes an alteration in priority to place the slave device 3-1 to be read at the highest priority.

After the read access time (assuming that it is equivalent to 5 clock cycles corresponding to the predicted access time) elapses from the issue of the read command RR from the master device 2-1, at a time t9, the slave device 3-1 to be read transmits the bus request REQ(S1) to the bus arbiter 4. Since the bus grant GNT(S1) at a high level has already been transmitted to the slave device 3-1, and the priority of the bus request REQ(Sl) from the slave device 3-1 is higher than that of the bus request REQ(M2) from the master device 2-2, at a time t10, the read data RD begins to be transferred to the master device 2-2 from the slave device 3-1 via the bus 1.

In this way, the bus system 100 spends only 6 clock cycles from the time t4 when the issue of the read command RR from the master device 2-1 is completed to the time t10 when the slave device 3-1 begins to transfer the read data RD. Referring to the operation timing chart of FIG. 1B, the conventional split transaction bus spends to clock cycles from the time t4 to the read response, that is, the time t14 when the read data RD begins to be transferred. Therefore, applying this invention enables the read response to be advanced by 4 clock cycles. Besides, with reference to FIG. 2, which is the operation timing chart for the second conventional method in which priority is given to the bus request from the slave device unless the bus is being used, 7 clock cycles are spent until the time t11 when the transfer begins, so that applying this invention enables the read response to be advanced by one clock cycle. In addition, this embodiment solves the problem of the second conventional method as follow: in this embodiment, since the slave device to be read is parked during the last clock cycle before the expected access time, the master device can be parked without any problem until that. In addition, in this embodiment, even if another master device uses the bus during the read access time, since the parking of the slave device to be read occurs after that, the arbitration cycle does not occur.

Figure 6:
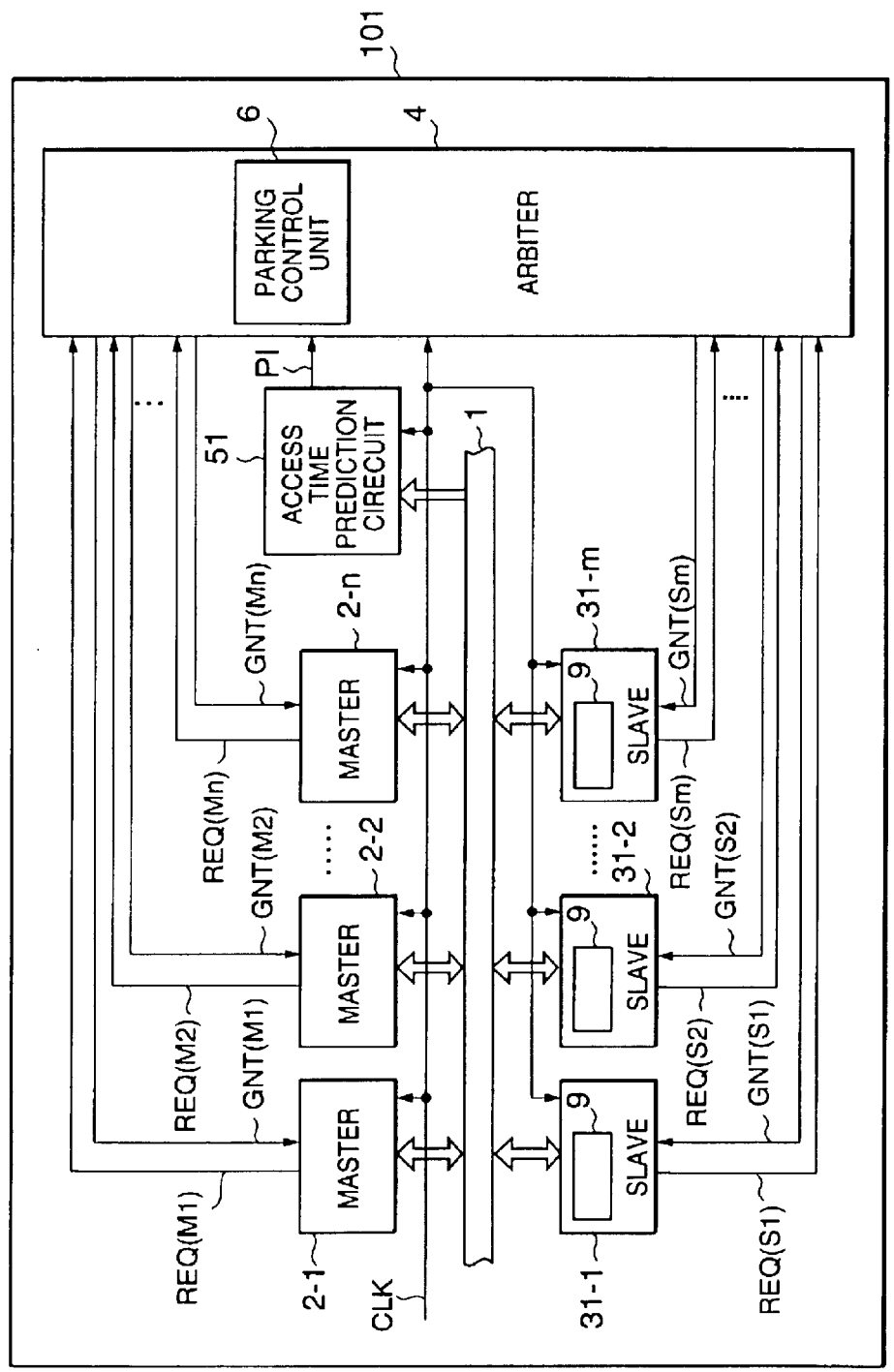
FIG. 6 is a block diagram of a bus system according to a second embodiment.

FIG. 6 is a block diagram of a bus system 101 according to a second embodiment of this invention. In the bus system 101, the slave devices 31-1 to 31-*m* include their respective access time output means 9, and the bus system 101 comprises an access time prediction circuit 51 instead of the access time prediction circuit 5 in the bus system 100 according to the first embodiment. The access time output means 9 in the slave device to be read sends the access time Tac to the access time prediction circuit 51. Since the access time prediction circuit 51 receives the access time Tac from the slave device to be read via the bus, it need not have the access time table.

Figure 7:
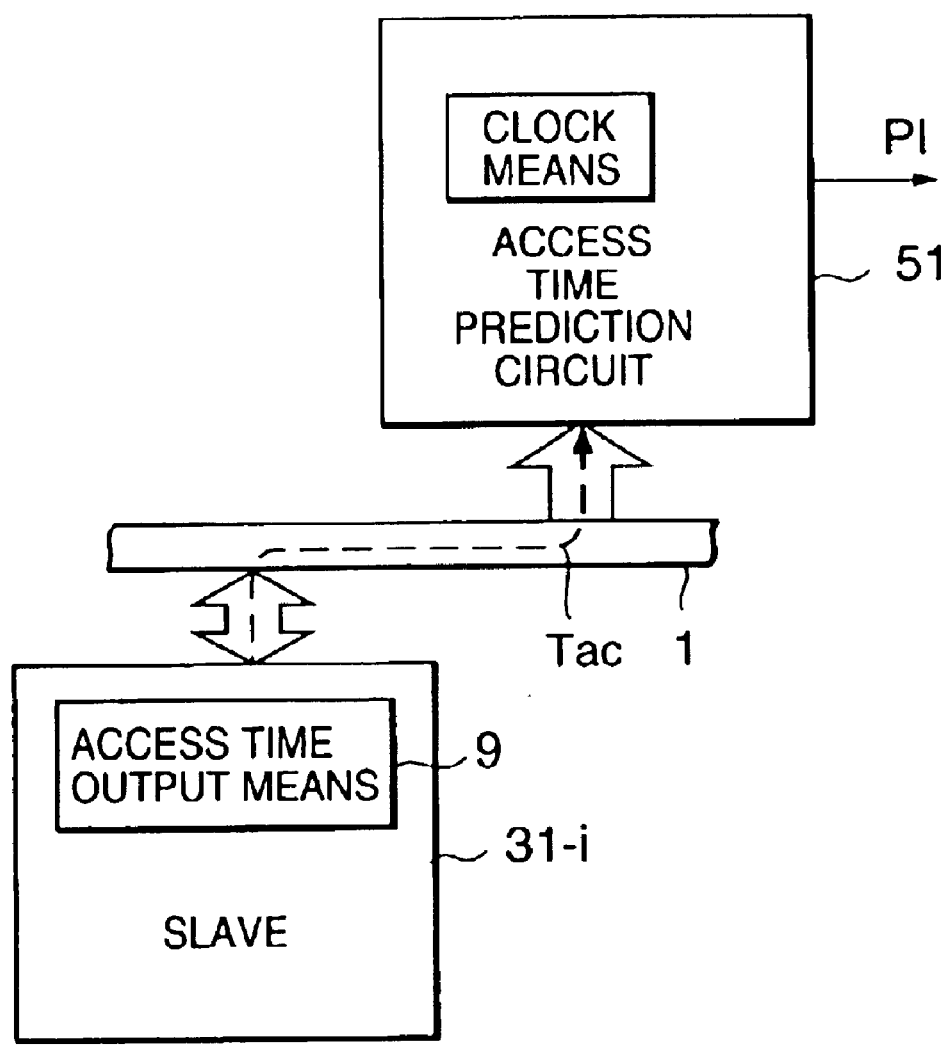
FIG. 7 schematically illustrates an operation of acquiring access time information according to the second embodiment, the access time prediction circuit receiving the data access time information from the slave device, which is the target of the read, via the bus.

FIG. 7 schematically illustrates an operation of acquiring the access time information in the bus system 101. The slave device 31-*i* to be read outputs the access time Tac including the slave device name and the access time via the access time output means 9 during an idle period (the period from the time t4 to t5 in FIG. 5) of the bus 1 after the read command RR is issued from the master device. The access time prediction circuit 51 fetches the access time Tac from the bus 1, predicts the access time of the slave device 31-*i* to be read based thereon, measures the elapsed time from the issue of the read command, and sends the parking indication PI to the arbiter 4 during the last clock cycle before the predicted access time Tac elapses. In this embodiment also, the operation is the same as that shown in the operation timing chart of FIG. 5, so that the same effect as in the first embodiment can be attained. In addition, since the access time prediction circuit 5 does not include the access time table, there is provided an advantage that the access time prediction circuit can be reduced in size.

Figure 8:
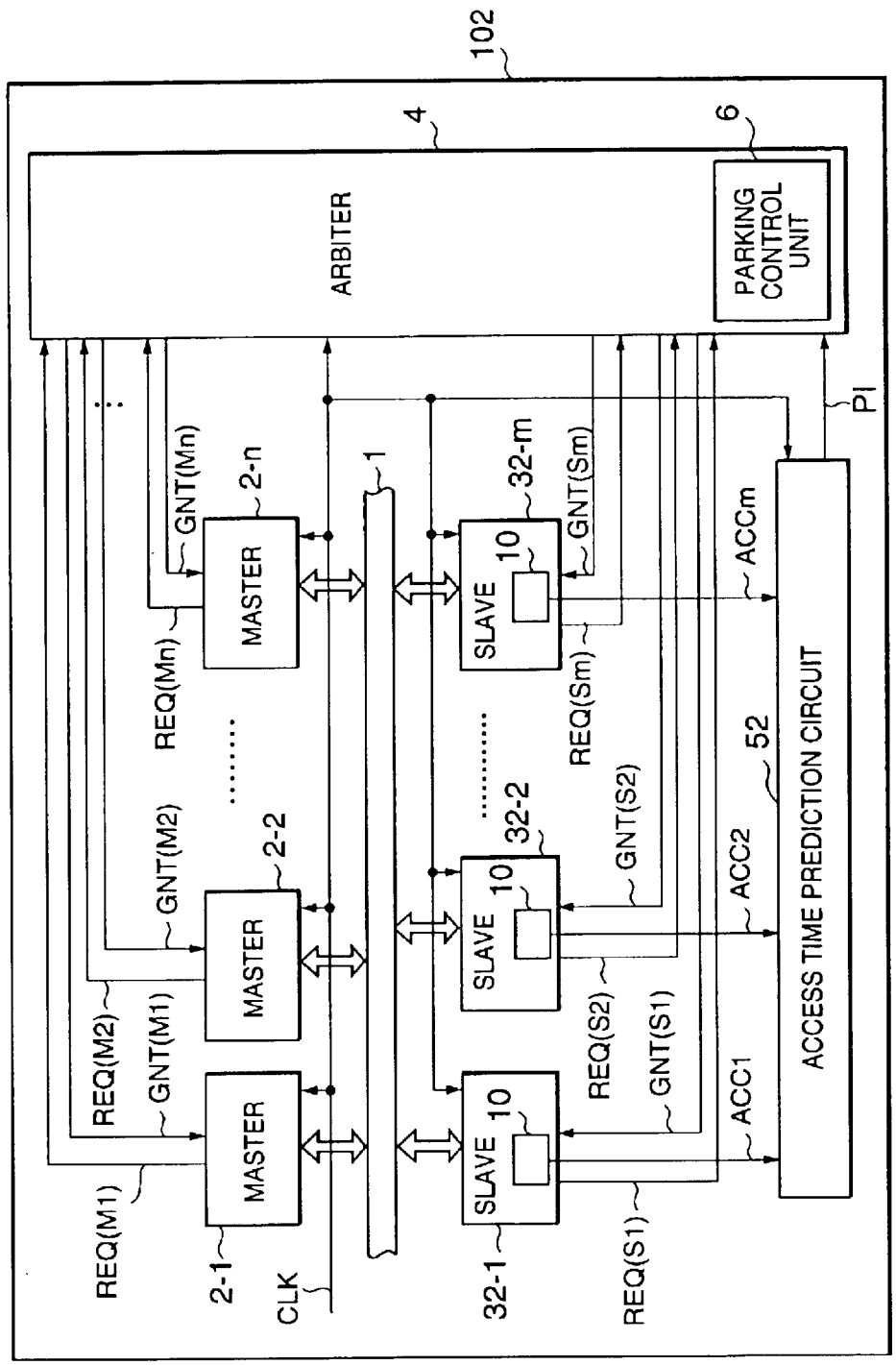
FIG. 8 is a block diagram of a bus system according to a third embodiment, the slave device including an access information generation unit, and the access information being transmitted to the access time prediction circuit via a dedicated line provided between the slave device and the access time prediction circuit.

FIG. 8 is a block diagram of a bus system according to a third embodiment of this invention. In a bus system 102, the slave devices 32-1 to 32-*m* include their respective access time output means 10, and the bus system 102 comprises an access time prediction circuit 52 instead of the access time prediction circuit 51 in the bus system 100 according to the first embodiment. The slave devices send access information ACC to the access time prediction circuit 52 via their respective dedicated connection lines.

According to this embodiment, since the access time prediction circuit 52 can continuously receive the access information ACCi for the slave device 32-*i* to be read via the dedicated line, it can appropriately accommodate even the case where the slave device 32-*i* to be read is a DRAM, and a refresh cycle occurs during the predicted access time thereby altering the predicted access time. That is, at a time when the refresh occurs, the slave device 32-*i* informs the access time prediction circuit 52 of the refresh to make it stop measuring time, and at a time when the refresh is completed, the updated access information ACCi is sent to the access time prediction circuit to make it restart measuring time. A normal operation in which the predicted access time is not altered is the same as that shown in the operation timing chart of FIG. 5, so that the same advantage as in the first embodiment can be attained.

Figure 9:
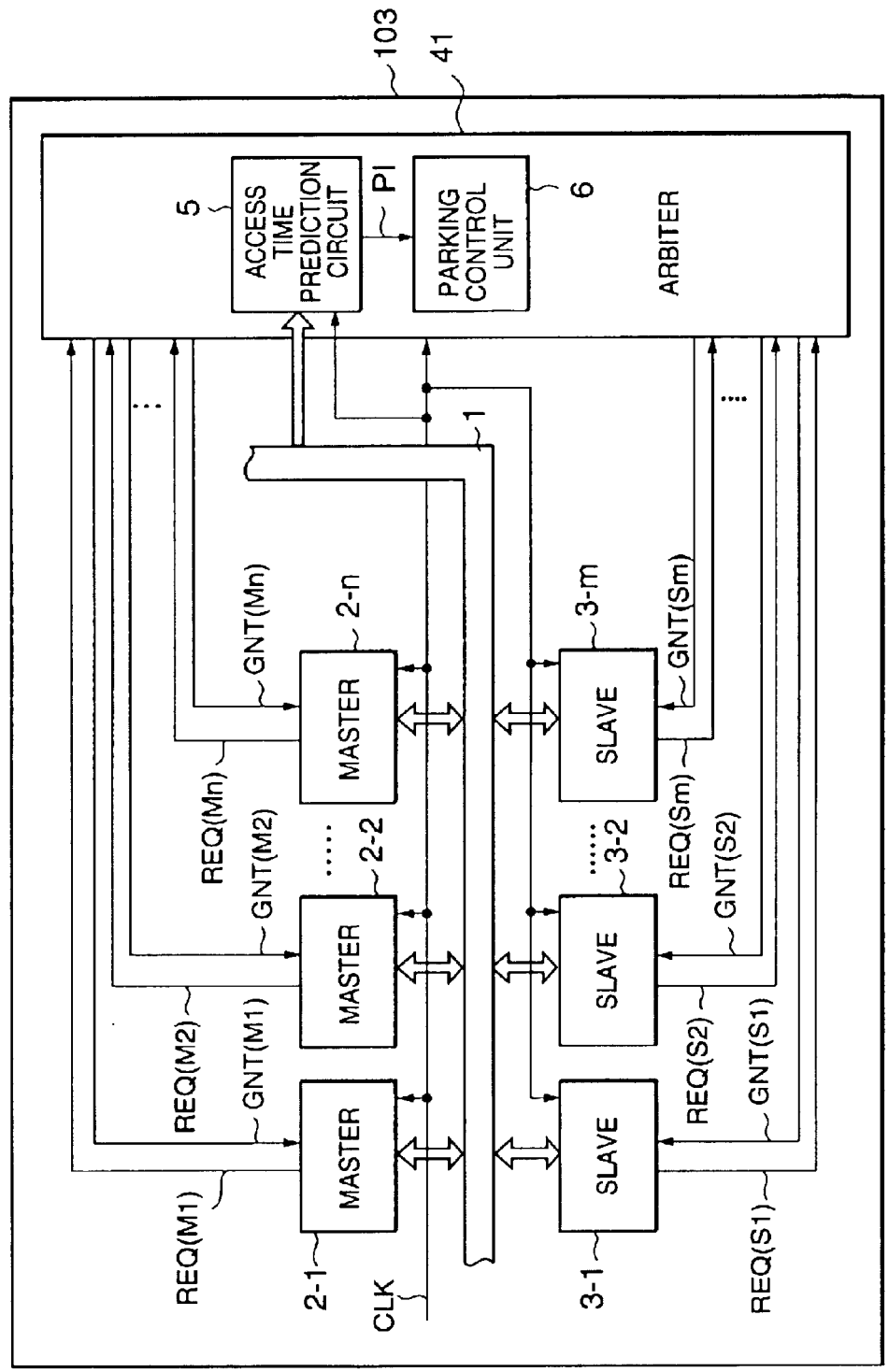
FIG. 9 is a block diagram of a bus system according to a fourth embodiment, the bus system having the same configuration as that of the first embodiment shown in FIG. 3 except that the access time prediction circuit is provided in the arbiter.

FIG. 9 is a block diagram of a bus system according to a fourth embodiment of this invention. A bus system 103 comprises an arbiter 41 including the access time prediction circuit 5. That is, it is equivalent to the bus system 100 according to the first embodiment having the access time prediction circuit thereof included in the arbiter. Therefore, besides the same advantage as the one of the first embodiment, the number of parts constituting the bus system can be reduced compared to the first embodiment.

Figure 10:
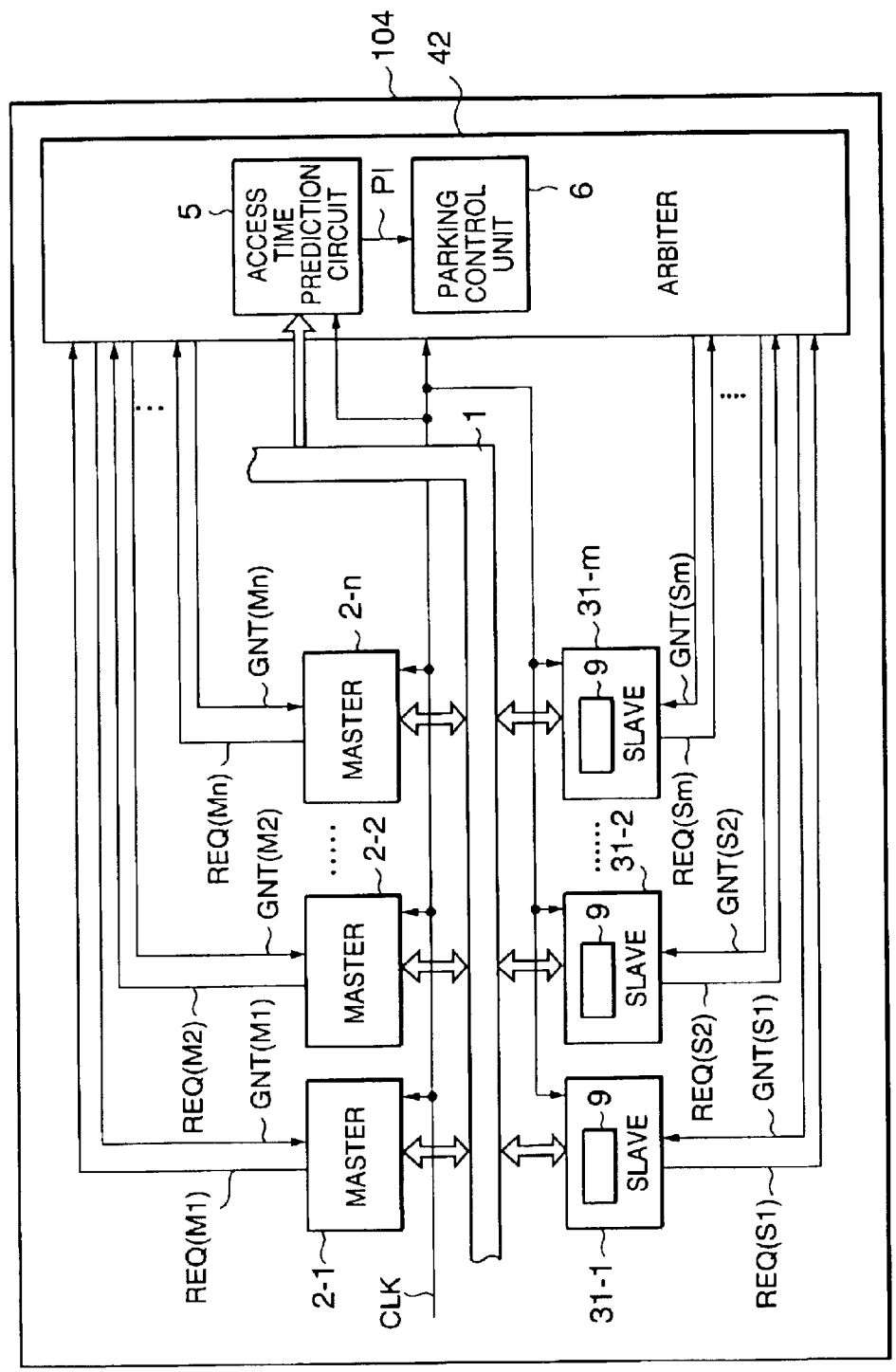
FIG. 10 is a block diagram of a bus system according to a fifth embodiment, the bus system having the same configuration as that of the second embodiment shown in FIG. 6 except that the access time prediction circuit is provided in the arbiter.

FIG. 10 is a block diagram of a bus system according to a fifth embodiment of this invention. A bus system 104 comprises an arbiter 42 including the access time prediction circuit 51. That is, it is equivalent to the bus system 101 according to the second embodiment having the access time prediction circuit thereof included in the arbiter. Therefore, besides the same advantage as the one of the second embodiment, the number of parts constituting the bus system can be reduced compared to the second embodiment.

Figure 11:
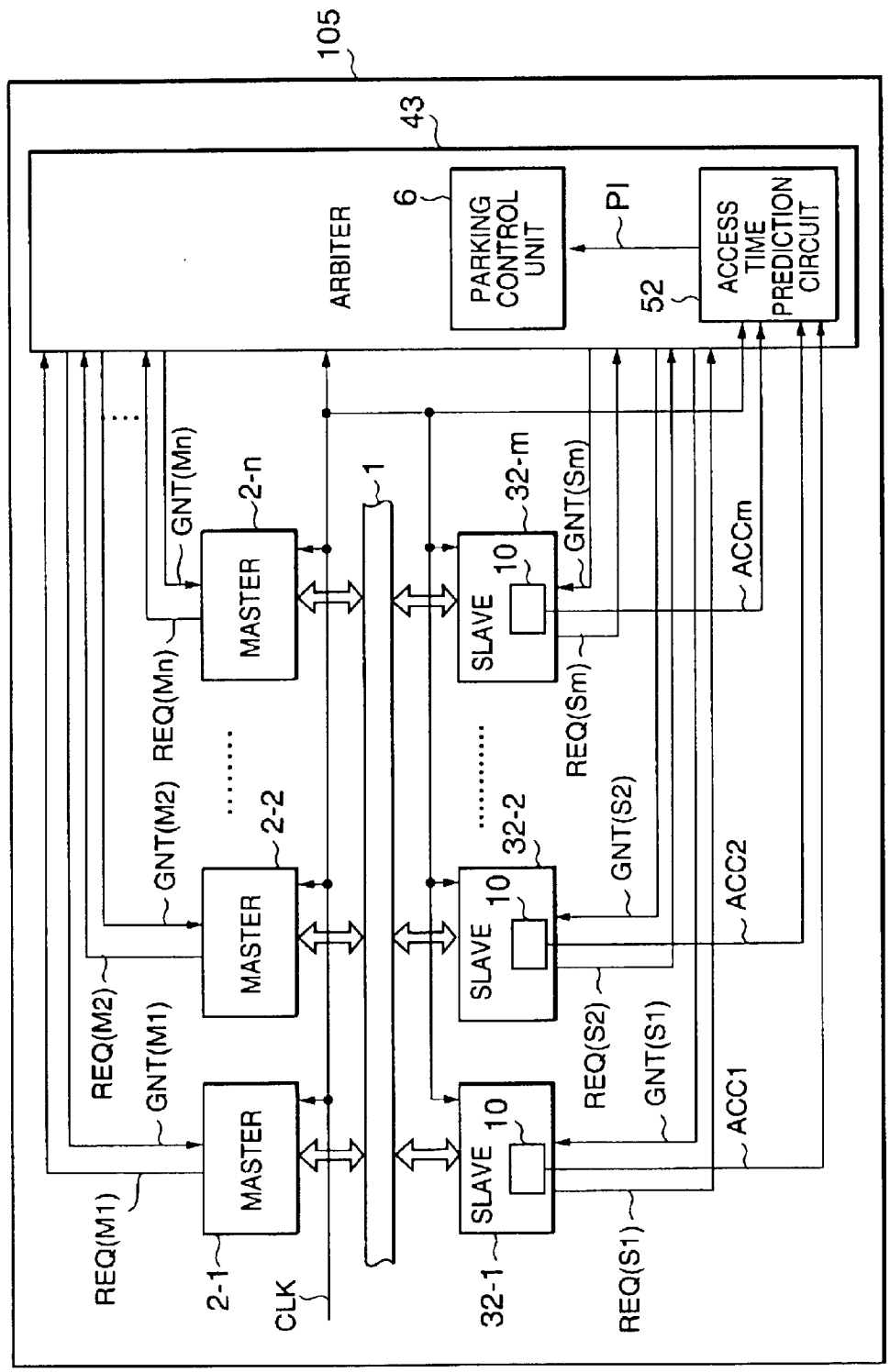
FIG. 11 is a block diagram of a bus system according to a sixth embodiment, the bus system having the same configuration as that of the third embodiment shown in FIG. 8 except that the access time prediction circuit is provided in the arbiter.

FIG. 11 is a block diagram of a bus system according to a sixth embodiment of this invention. A bus system 105 comprises an arbiter 43 including the access time prediction circuit 52. That is, it is equivalent to the bus system 102 according to the third embodiment having the access time prediction circuit thereof included in the arbiter. Therefore, besides the same advantage as the one of the third embodiment, the number of parts constituting the bus system can be reduced compared to the third embodiment.

Figure 12:
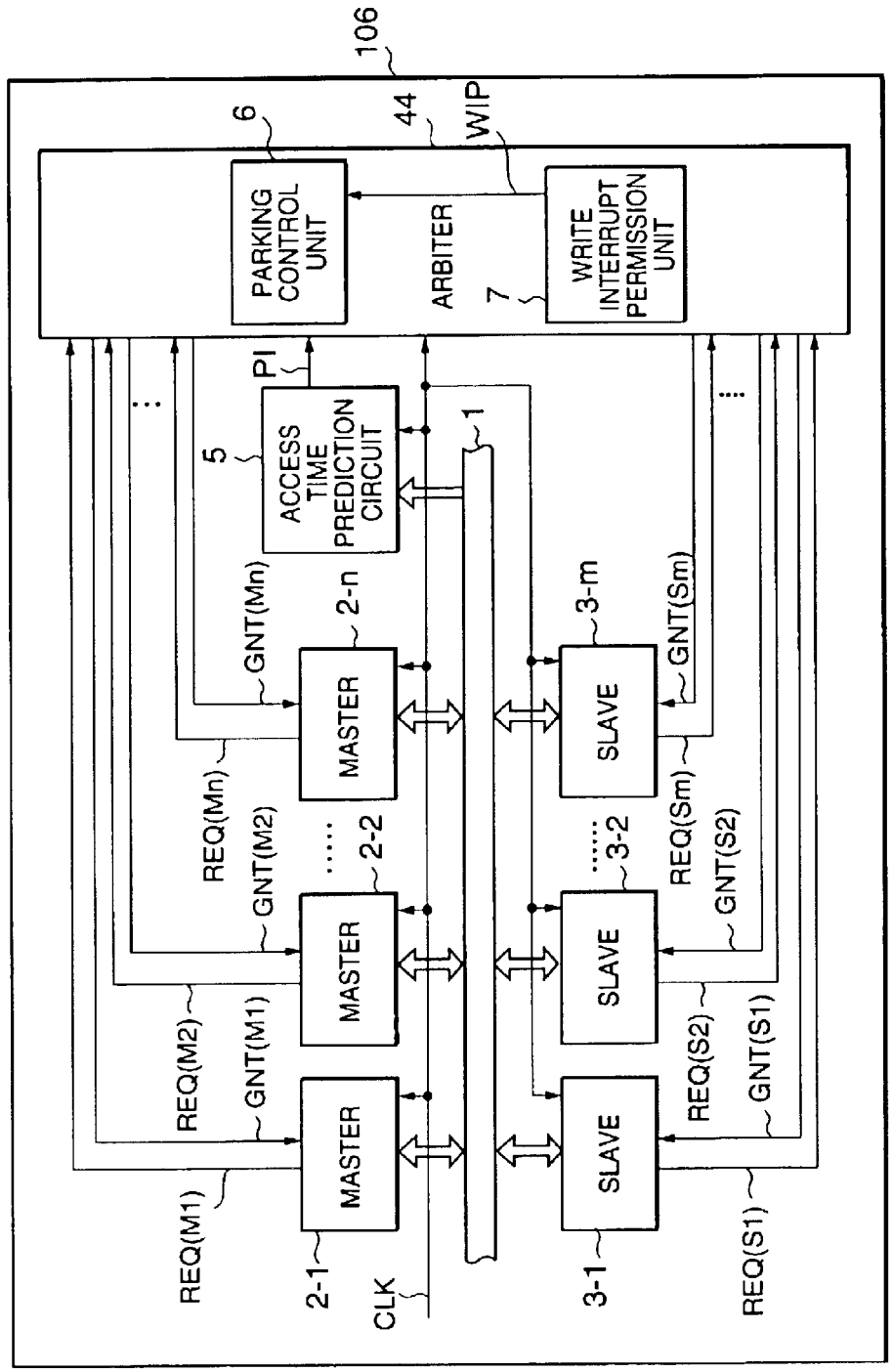
FIG. 12 is a block diagram of a bus system according to a seventh embodiment, the bus system having a configuration equivalent to that of the first embodiment shown in FIG. 3 except that the arbiter includes a write interrupt permission unit for deciding the write interrupt to be enabled or disabled.

FIG. 12 is a block diagram of a bus system according to a seventh embodiment of this invention. A bus system 106 is equivalent to the system according to the first embodiment shown in FIG. 3 having the arbiter 4 thereof replaced with the arbiter 44. The bus system 106 comprises a write interrupt permission unit 7. Besides the same function as the arbiter 4 in the bus system 100, the arbiter 44 has a function of interrupting a current write cycle when the write interrupt permission is set. That is, the arbiter 44 receives the parking indication PI including the name of the slave device to be read from the access time prediction circuit 5 during the last clock cycle before the predicted access time Tac elapses from the issue of the read command, and unless the bus 1 is being used, parks the slave device to be read by transmitting the bus grant thereto under the control of the parking control unit 6. In addition, it places the parked slave device at the highest priority. Furthermore, if the write interrupt permission unit 7 is set to the interrupt permission, when a bus request from a master device occurs during the access time of the slave device to be read and thereby a write cycle occurs, the arbiter 44 interrupts the current write cycle during the last clock cycle before the predicted access time Tac and parks the slave device to be read.

FIG. 13 is a flow chart illustrating an operation of parking control by the arbiter 44 in the bus system 106. When a write cycle occurs after the read command RR is issued, in step 11, the parking control unit 6 in the arbiter 44 determines whether the write interrupt permission unit is set to the write interrupt permission or not according to a signal level of a write interrupt permission signal WIP. In the case where the write interrupt is permitted, if the parking indication PI is received from the access time prediction circuit 5 in step 12, the process continues to step 13, where the arbiter 44 deprives the master device executing the write cycle of the bus ownership under the control of the parking control unit 6. Thus, the master device deprived of the bus ownership conducts a write cycle interrupt processing using a function previously implemented therein, and then releases the bus 1. In step 14, the arbiter 44 parks the slave device to be read by transmitting the bus grant thereto under the control of the parking control unit 6.

Figure 14A:
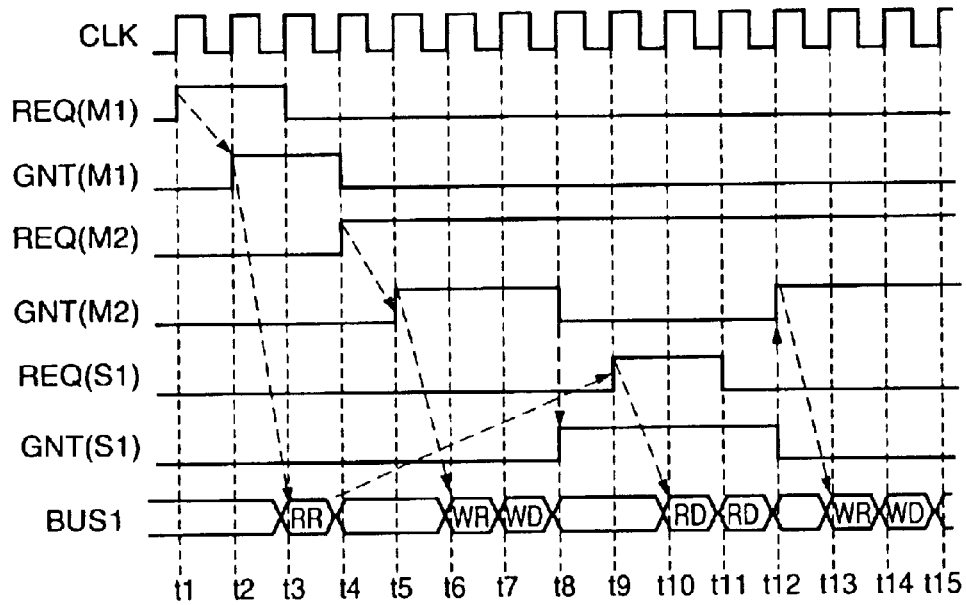
FIG. 14A is a timing chart illustrating an operation when the write interrupt permission unit is set to the write permission.

FIG. 14A is a timing chart illustrating an operation when the write interrupt permission unit 7 is set to the interrupt permission. For the sake of comparison, FIG. 14B is a timing chart illustrating an operation when the write interrupt permission unit 7 is not set to the interrupt permission.

Referring to FIG. 14A, in response to the bus request REQ(M1) transmitted form the master device 2-1 at the time t1, the bus grant GNT(M1) is transmitted from the arbiter 44 at the time t2, and the read command RR is issued to the slave device 3-1 via the bus 1 at the time t3. Since the master device 2-1 once releases the bus after the read command RR is issued, in response to the bus request REQ(M2) transmitted from the master device 2-2 at the time t4, the bus grant GNT(M2) is transmitted at the time t5, and the write cycle occurs at the time t6. At the time t6, the write command WR is issued from the master device 2-2 to the slave device 3-2 via the bus 1, and then at the time t7, the write data WR begins to be transferred slave device 3-2 via the bus 1. Since the predicted access time Tac of the slave device 3-1 to be read is equivalent to 5 clock cycles, the parking indication PI is sent to the arbiter 44 from the access time prediction circuit 5 at the time t8 when the last clock cycle before the access occurs. The arbiter 44 cancels the bus grant GNT (M2) having given to the master device 2-2 executing the write cycle, and transmits the bus grant GNT(S1) to the slave device 3-1 to be read, thereby parking the slave device 3-1.

When the predicted access time Tac elapses, and the data in the slave device 3-1 to be read is ready for output and the bus request REQ(S1) is transmitted at the time t9, the slave device 3-1, which has already acquired the bus grant GNT (S1), can transfer the read data RD at the time t10: After the read response cycle is completed at the time t12, the interrupted write cycle from the master device 2-2 to the slave device 3-2 restarts at the time t13 in response to the bus grant GNT(M2) transmitted again.

Figure 14B:
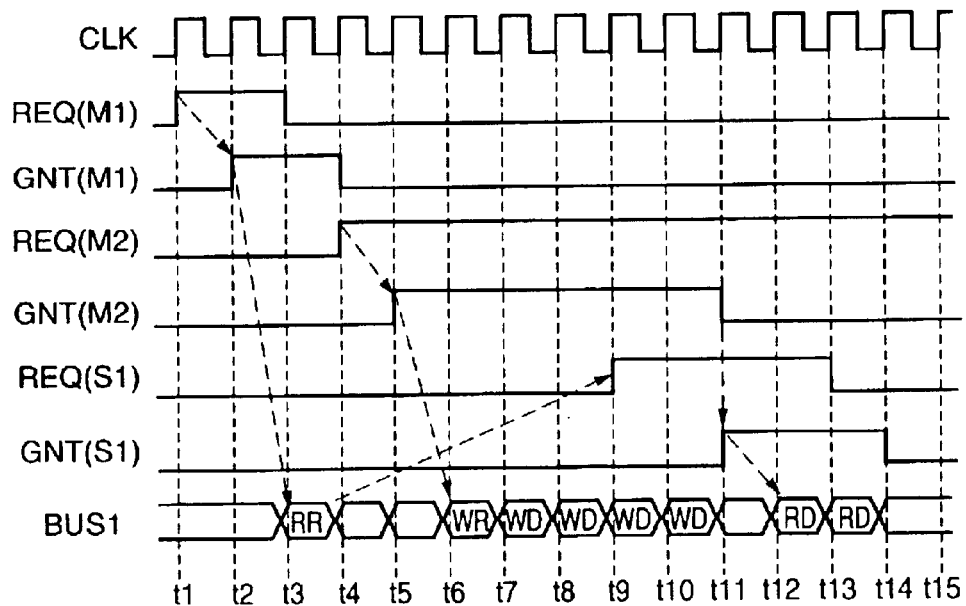
FIG. 14B is a timing chart illustrating an operation when the write interrupt permission unit is not set to the write permission.

On the contrary, in the case shown in FIG. 14B, that is, in the case where the write interrupt permission unit 7 is not set to the interrupt permission, the write cycle occurring at the time t6 is not interrupted to continue until the time t11, and then at the time t11, the bus grant GNT(S1) is transmitted to the slave device 3-1 to be read. As a result, the read data RD begins to be transferred at the time t12.

Thus, according to this embodiment, the read data can begin to be transferred at the time t10 by setting the write interrupt permission unit 7 in the arbiter 44 to the interrupt permission. Therefore, by applying this embodiment, the read data can be transferred before the time t12 for beginning the transfer in FIG. 14B that illustrates the case where the write interrupt permission unit 7 is not provided or the case where although the write interrupt permission unit 7 is provided, it is not set to the interrupt permission. In the case where the write cycle continues for a long time, such as of a block write or burst write, the effect of advancing the read response becomes particularly significant by applying this embodiment. In this embodiment, the write interrupt permission unit 7 may be fixedly set to the interrupt permission, or may be configured to be externally set to the permission or prohibition from the outside of the arbiter 44. Besides, the access time prediction circuit 5 may be provided in the arbiter 44.

Figure 15:
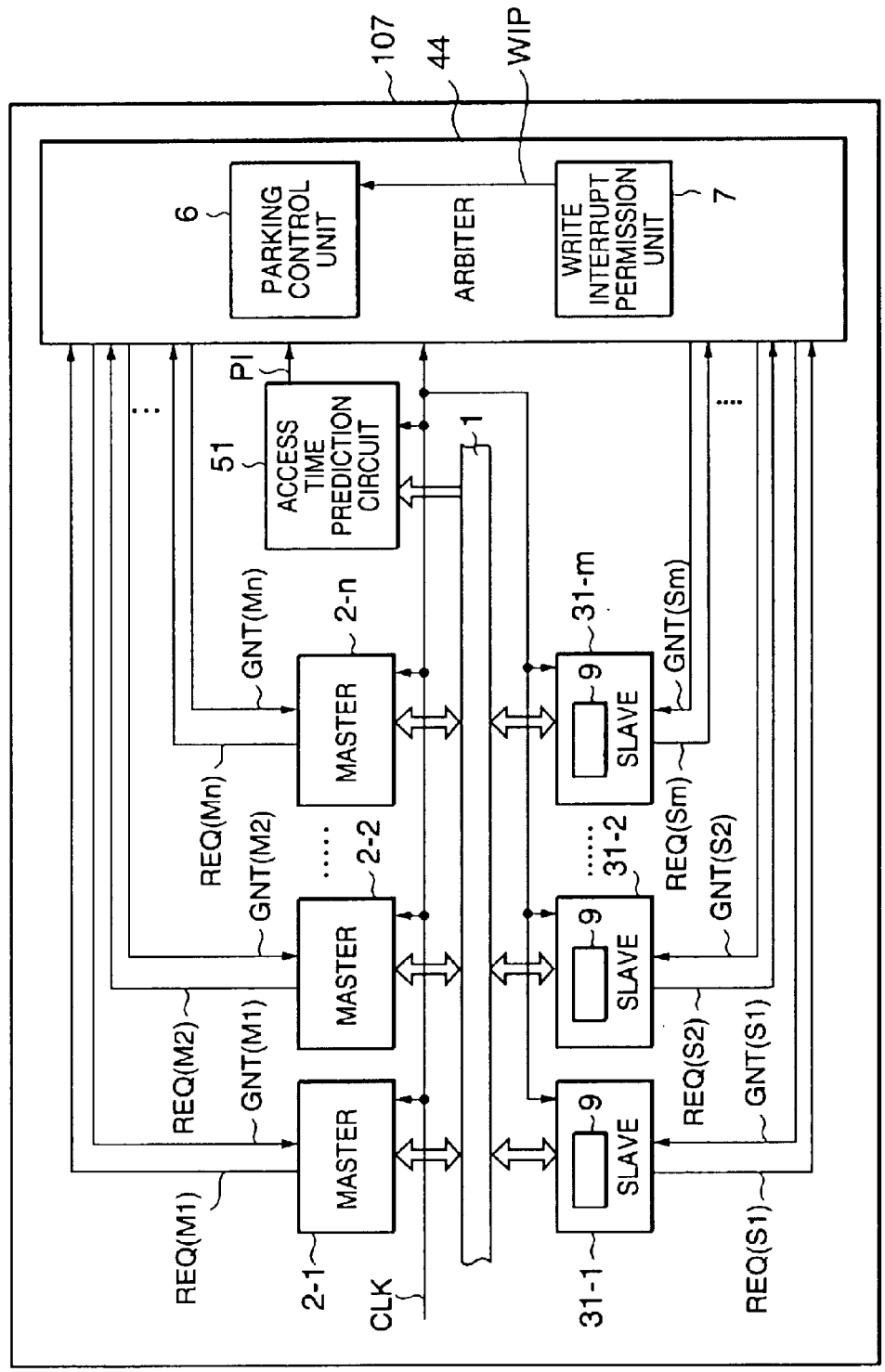
FIG. 15 is a block diagram of a bus system according to an eighth embodiment, the bus system having a configuration equivalent to that of the second embodiment shown in FIG. 6 except that the arbiter includes a write interrupt permission unit for deciding the write interrupt to be enabled or disabled.

FIG. 15 is a block diagram of a bus system 107 according to an eighth embodiment of this invention. The bus system 107 is equivalent to the bus system 101 according to the second embodiment shown in FIG. 6 except that the arbiter 4 thereof is replaced with the arbiter 44 including the write interrupt permission unit 7. According to this embodiment, besides the same advantage as the one of the second embodiment, the read response can be, advanced by setting the write interrupt permission unit 7 to the interrupt permission so that the write cycle is interrupted. Besides, the access time prediction circuit 51 may be provided in the arbiter 44.

Figure 16:
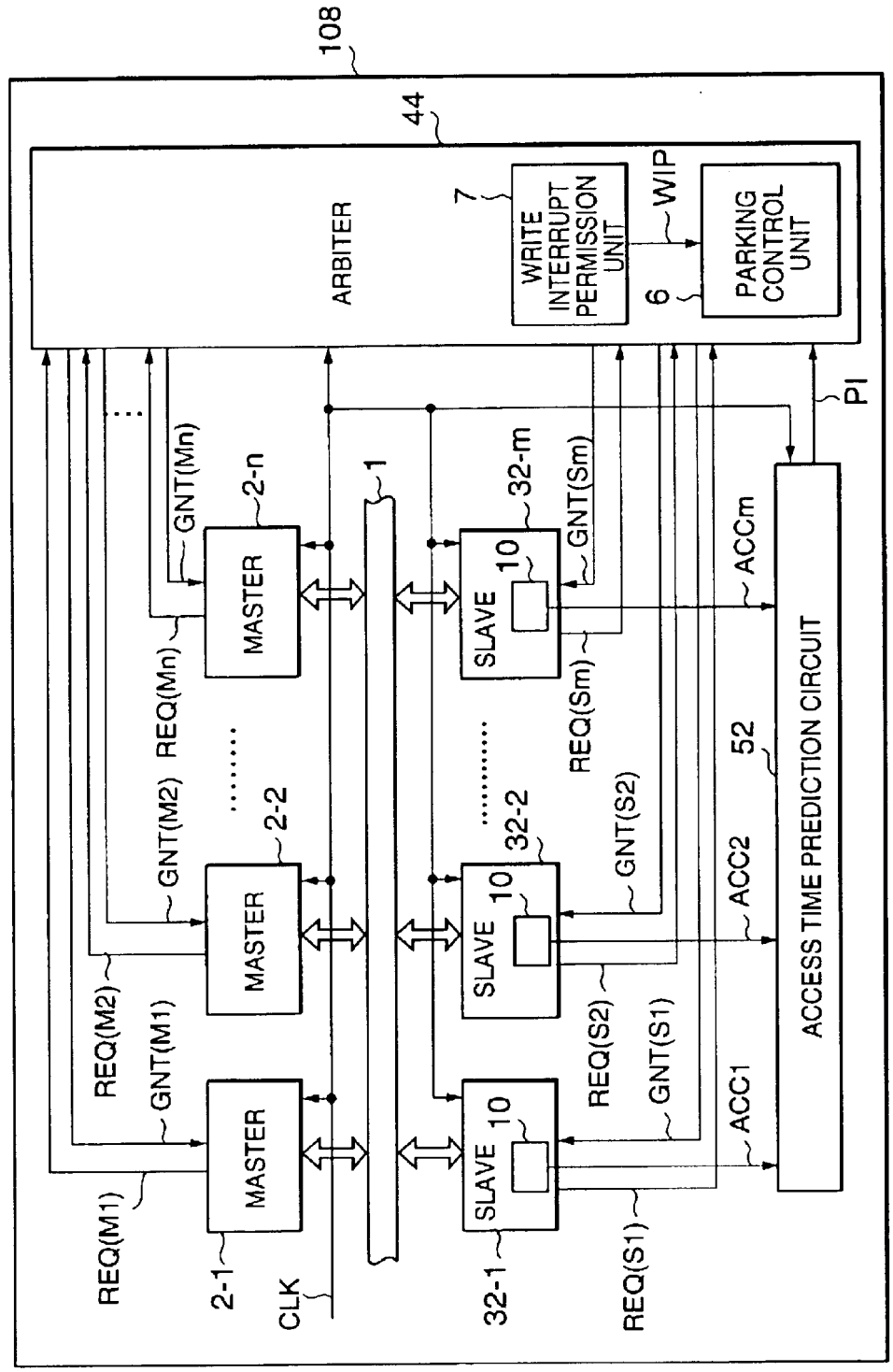
FIG. 16 is a block diagram of a bus system according to a ninth embodiment, the bus system having a configuration equivalent to that of the third embodiment shown in FIG. 8 except that the arbiter includes a write interrupt permission unit for deciding the write interrupt to be enabled or disabled.

FIG. 16 is a block diagram of a bus system 108 according to a ninth embodiment of this invention. The bus system 108 is equivalent to the bus system 102 according to the third embodiment shown in FIG. 8 except that the arbiter 4 thereof is replaced with the arbiter 44 including the write interrupt permission unit 7. According to this embodiment, besides the same advantage as the one of the third embodiment, the read response can be advanced by setting the write interrupt permission unit 7 to the interrupt permission so that the write cycle is interrupted. Besides, the access time prediction circuit 52 may be provided in the arbiter 44.

Figure 17:
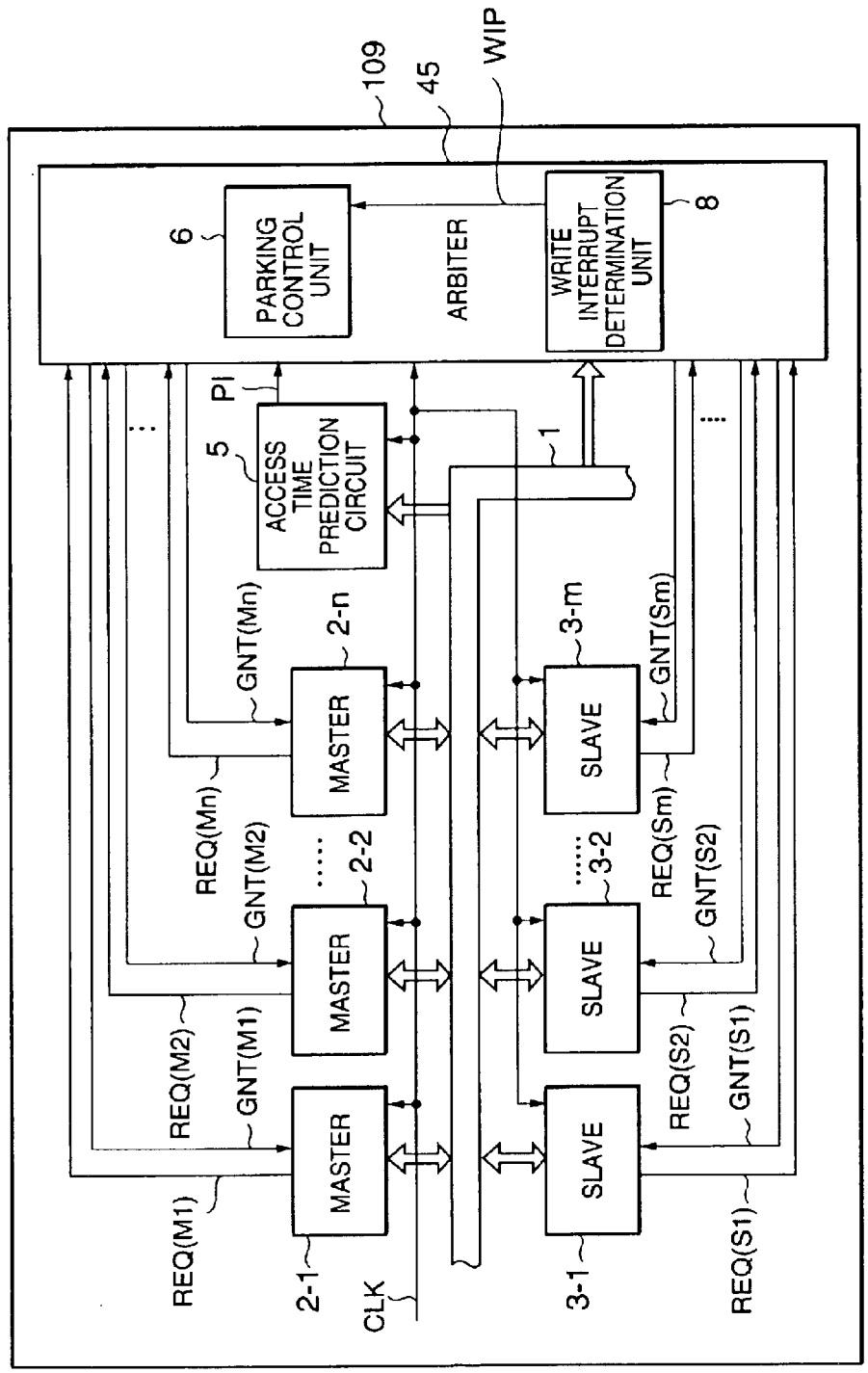
FIG. 17 is a block diagram of a bus system according to a tenth embodiment, the bus system having a configuration equivalent to that of the first embodiment shown in FIG. 3 except that the arbiter includes a write interrupt determination unit for determining whether the write interrupt is to be enabled or disabled.

FIG. 17 is a block diagram of a bus system according to a tenth embodiment of this invention. A bus system 109 is equivalent to the system according to the first embodiment shown in FIG. 3 having the arbiter 4 thereof replaced with the arbiter 45. In the bus system 109, the arbiter 45 is connected to the bus 1 and comprises the write interrupt determination unit 8. Besides the same function as the arbiter 4 in the bus system 100, the arbiter 45 in the bus system 109 has a function of interrupting the current write cycle if a predetermined condition is met. That is, the arbiter 45 receives the parking indication PI including the name of the slave device to be read from the access time prediction circuit 5 during the last clock cycle before the predicted access time Tac elapses from the issue of the read command, and unless the bus 1 is being used, parks the slave device to be read by transmitting the bus grant thereto under the control of the parking control unit 6. In addition, it places the parked slave device at the highest priority. Furthermore, in the arbiter, when a write cycle occurs in response to the bus request from the master device during the access time of the slave device to be read, the write interrupt determination unit 8 compares the number of remaining write cycles (the number of clock cycles) Nw at the expected access time with the number of clock cycles Ndr required for the read response, the number of remaining write cycles being obtained by adding the time of the issue of the read command to the predicted access time Tac. If the comparison results in Nw≧Ndr, the write interrupt determination unit 8 outputs the write interrupt permission signal WIP with being set at a predetermined signal level to the parking control unit.6. Under the control of the parking control unit 6, the arbiter 45 interrupts the current write cycle during the last clock cycle before the predicted access time Tac and parks the slave device to be read.

Figure 18:
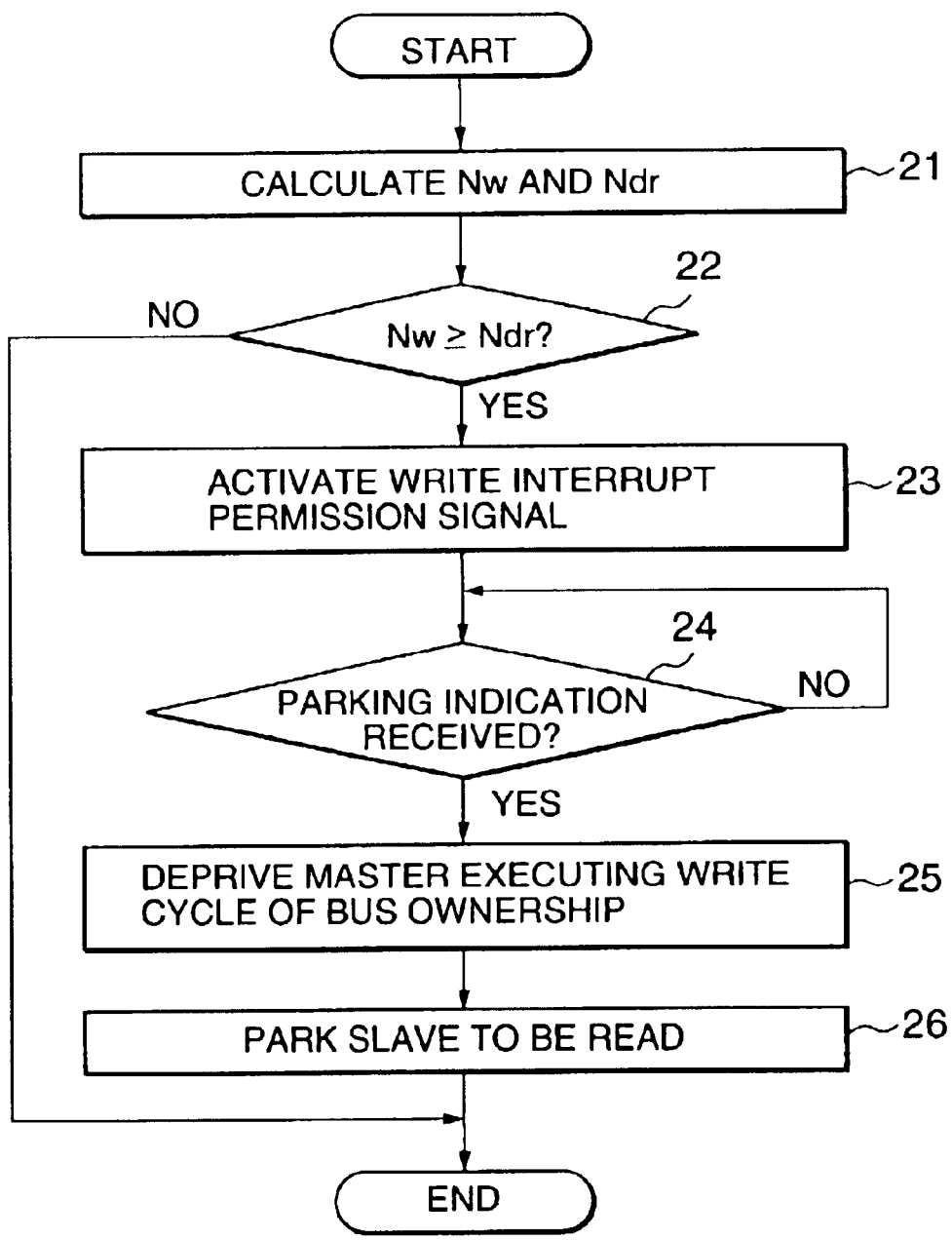
FIG. 18 is a flow chart illustrating an operation of parking control by the arbiter according to the tenth embodiment.

FIG. 18 is a flowchart illustrating an operation of parking control by the arbiter 45. When a write cycle occurs after the read command RR is issued, in step 21, the write interrupt determination unit 8 in the arbiter 45 calculates the number of clock cycles of the remaining write cycles at the expected access time by referring to the information of the write command WR in the bus 1. Besides, the write interrupt determination unit 8 calculates the number of clock cycles Ndr required for the read response cycle based on the information of the read command RR previously referred to and recorded therein. Then, in step 22, if Nw≧Ndr is resulted, the process continues to step 23, and if Nw<Ndr is resulted, the parking control is ended and the current write cycle continues. If the process continues to step 23, the write interrupt determination unit 8 switches the write interrupt permission signal WIP to an active level, and then the process continues to step 24, where the write interrupt determination unit 8 waits for the parking control unit 6 to received the parking indication PI. If the access time prediction circuit 5 sends the parking indication PI during the last clock cycle before the predicted access time Tac, and the parking control unit 6 receives the parking indication, the process continues to step 25, and the arbiter 45 deprives the master device executing the write cycle of the bus ownership under the control of the parking control unit 6. Thus, the master device deprived of the bus ownership conducts a write cycle interrupt processing using a function previously implemented therein, and then releases the bus 1. In step 26, the arbiter 45 parks the slave device to be read by transmitting the bus grant thereto under the control of the parking control unit 6, and then, the parking control is ended.

Referring to FIG. 14B, at the time t3, the write interrupt determination unit 8 stores therein the number of pieces of read data RD from the read command RR output to the bus 1. At the time t6, step 21 is executed. Since the total number of write cycles is proved to be 5 by referring to the information of the write command WR, and the number of clock cycles up to the expected access time t9 is 3, the calculation of the number of remaining write clock cycles Nw at the expected access time t9 results in 2. Similarly, as for the number of clock cycles Ndr required for the read response, since one clock cycle is required from the transmission of the bus request to the transfer of the read data RD, and the number of pieces of read data is 2, the calculation of Ndr results in 3. In such case, it is determined in step 23 that the relationship of Nw≧Ndr is not satisfied. Therefore, the write interrupt determination processing is ended, the current write cycle continues, and thus, the operation up to the time t15 is exactly the same as that shown in FIG. 14B.

On the contrary, in the case where the number of pieces of read data is 1, the value of Ndr is 2, so that it is determined in step 22 that the relationship of Nw≧Ndr is satisfied. As a result, as in the operation after the time t8 in FIG. 14A, the executed write cycle of the master device 2-2 is interrupted, and the slave device 3-1 to be read is parked. When the predicted access time Tac elapses, and the bus request REQ(S1) is transmitted from the slave device 3-1 to be read, the read response cycle starts from the next clock cycle, and the read data RD is transferred from the slave device 3-1.

Nw is equivalent to the expected time from the expected access time in the current write cycle until the end of the write cycle, and Ndr is equivalent to the expected time from the expected access time until the end of the read response cycle in the case where the write cycle is interrupted to start the read response cycle. In this embodiment, the time when the current write cycle will be ended and the time when the read response cycle would be ended if the write cycle is interrupted to start the read response cycle are compared with each other, and the cycle determined to be ended earlier is executed by priority. Thus, according to this embodiment, besides the same advantage as the one of the first embodiment, the bus efficiency can be improved further. In addition, the access time prediction circuit 5 may be provided in the arbiter 45.

Figure 19:
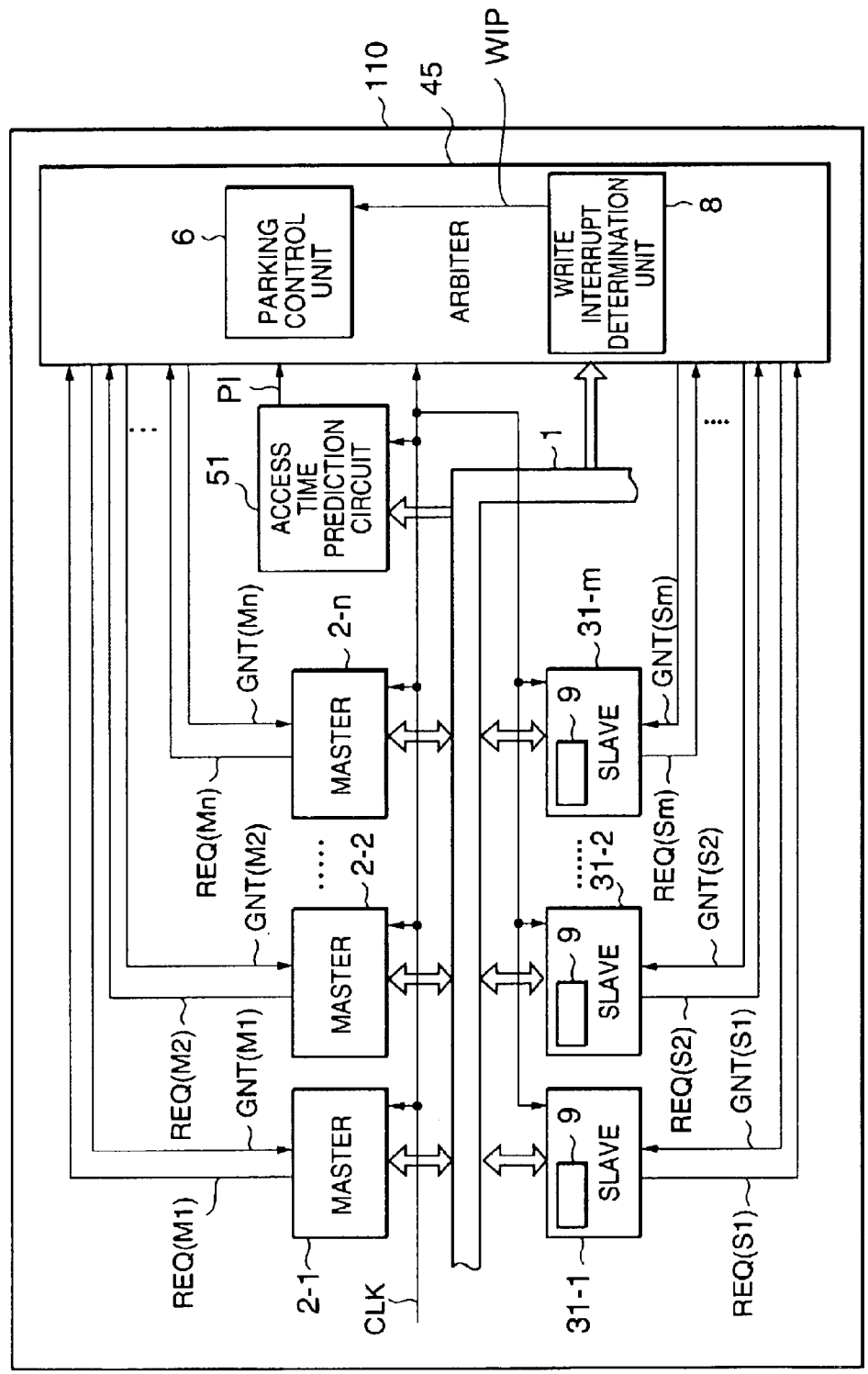
FIG. 19 is a block diagram of a bus system according to a eleventh embodiment, the bus system having a configuration equivalent to that of the second embodiment shown in FIG. 6 except that the arbiter includes a write interrupt determination unit for determining whether the write interrupt is to be enabled or disabled.

FIG. 19 is a block diagram of a bus system 110 according to an eleventh embodiment of this invention. The bus system 110 is equivalent to the bus system 101 according to the second embodiment shown in FIG. 6 except that the arbiter 4 thereof is replaced with the arbiter 45 including the write interrupt determination unit 8. According to this embodiment, besides the same advantage as the one of the second embodiment, the bus efficiency can be improved further. In addition, the access time prediction circuit 51 may be provided in the arbiter 45.

Figure 20:
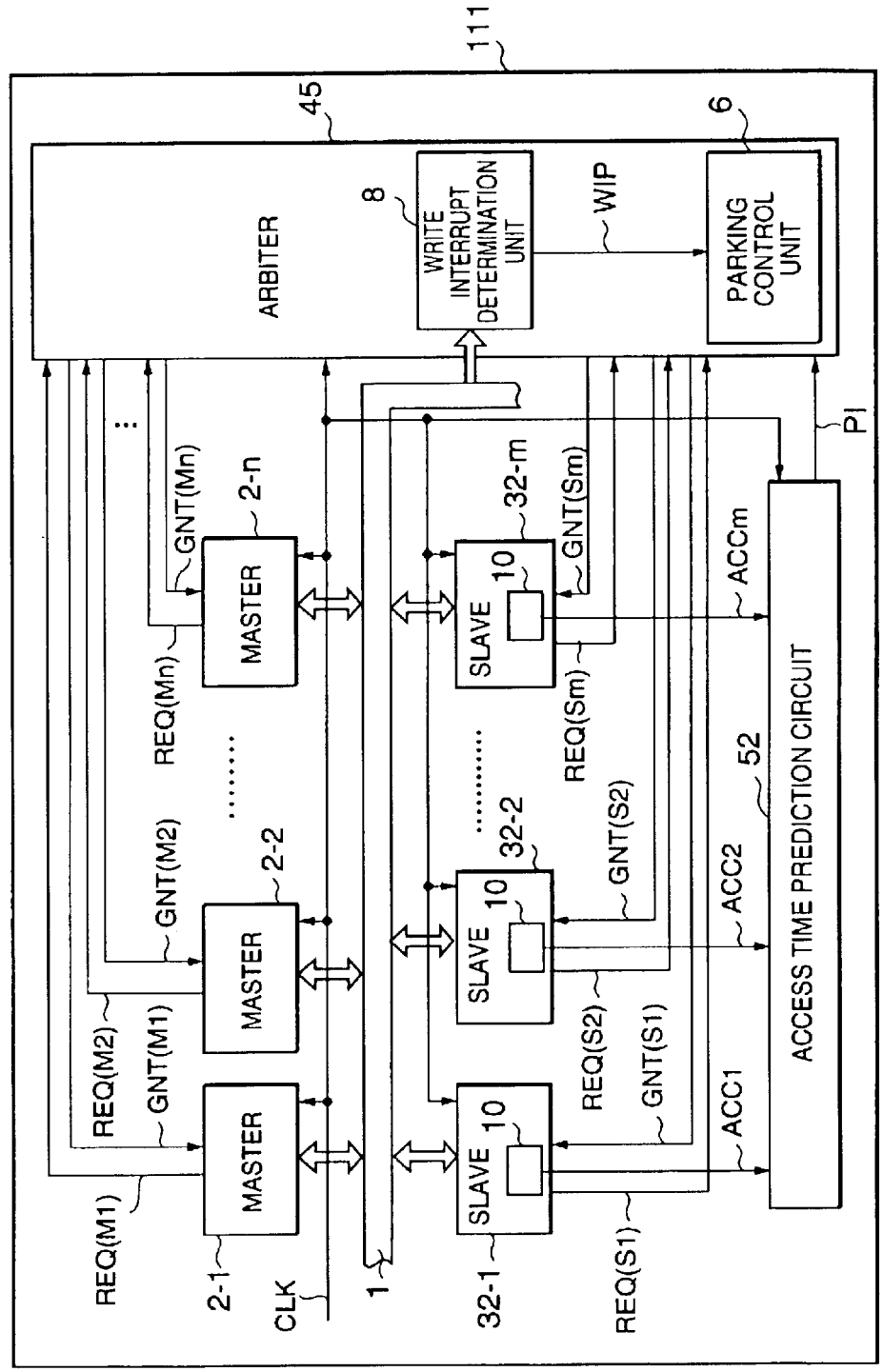
FIG. 20 is a block diagram of a bus system according to a twelfth embodiment, the bus system having a configuration equivalent to that of the third embodiment shown in FIG. 8 except that the arbiter includes a write interrupt determination unit for determining whether the write interrupt is to be enabled or disabled.

FIG. 20 is a block diagram of a bus system 111 according to a twelfth embodiment of this invention. The bus system 111 is equivalent to the bus system 102 according to the third embodiment shown in FIG. 8 except that the arbiter 4 thereof is replaced with the arbiter 45 including the write interrupt determination unit 8. According to this embodiment, besides the same advantage as the one of the third embodiment, the bus efficiency can be improved further. In addition, the access time prediction circuit 52 may be provided in the arbiter 45.

As described above, applying this invention allows the read response speed to be improved and the probability of the occurrence of the arbitration cycle to be reduced. Since the slave device to be read is parked immediately before the expected access time thereof, the read response from the slave device to be read can be advanced. Furthermore, in the case where another master device uses the bus during the period from the issue of the read command until the transmission of the bus request from the slave device, the arbitration cycle does not occur if the bus is released before the slave device to be read is parked, so that the bus efficiency is improved.

What is claimed is:

1. A split transaction bus system, comprising:
   a bus that is a data transfer path for a plurality of devices;
   two or more master devices connected to said bus and each having an output terminal for a bus request and an input terminal for a bus grant;
   one or more slave devices connected to said bus and each having an output terminal for a bus request and an input terminal for a bus grant;
   an access time prediction circuit that predicts an access time required for the data in the slave device to be read to be ready for output when a read command is issued from one of said master devices to one of said slave devices, measures an elapsed time based on a count of clock signals, and sends a parking indication to said slave device to be read during the last cycle before the predicted access time; and
   an arbiter having an input terminal for the bus request from said master device and said slave device and an output terminal for the bus grant to said master device and said slave device, and provided with an arbitration function of selecting the device to which a bus ownership is given in response to the bus request thereof and transmitting the bus grant thereto, and a parking control function of parking said slave device to be read by transmitting the bus grant to said slave device to be read unless said bus is being used when said parking indication is received, as well as placing said slave device to be read at the highest priority in the arbitration.

2. The split transaction bus system according to claim 1, wherein said access time prediction circuit includes an access time table of the slave devices and access times associated with each other, is connected to said bus to fetch the slave device to be read from the read command, and refers to said access time table to fetch the predicted access time.

3. The split transaction bus system according to claim 1, wherein said access time prediction circuit is connected to said bus, and receives access time information from the slave device to be read during a cycle immediately after the read command is issued and in which said bus is not occupied.

4. The split transaction bus system according to claim 1, wherein said access time prediction circuit is connected to each of said slave devices via a dedicated line thereof, and continuously receives access time information from the slave device to be read.

5. The split transaction bus system according to claim 2, wherein said access time prediction circuit is provided in said arbiter.

6. The split transaction bus system according to claim 3, wherein said access time prediction circuit is provided in said arbiter.

7. The split transaction bus system according to claim 6, wherein said access time prediction circuit is provided in said arbiter.

8. A split transaction bus system, comprising:

a bus that is a data transfer path for a plurality of devices;

two or more master devices connected to said bus and each having an output terminal for a bus request and an input terminal for a bus grant;

one or more slave devices connected to said bus and each having an output terminal for a bus request and an input terminal for a bus grant;

an access time prediction circuit that predicts an access time required for the data in the slave device to be read to be ready for output when a read command is issued from one of said master devices to one of said slave devices, measures an elapsed time based on a count of clock signals, and sends a parking indication to said slave device to be read during the last cycle before the predicted access time; and an arbiter having an input terminal for the bus request from said master device and said slave device and an output terminal for the bus grant to said master device and said slave device, and provided with an arbitration function of selecting the device to which a bus ownership is given in response to the bus request thereof and transmitting the bus grant thereto, and a parking control function of parking said slave device to be read by, if said bus is not being used when said parking indication is received, transmitting the bus grant to said slave device to be read, and if write is being executed, depriving the master device of the bus ownership and transmitting the bus grant to said slave device to be read, as well as placing said slave device to be read at the highest priority in the arbitration.

9. The split transaction bus system according to claim 8, wherein said access time prediction circuit includes an access time table of the slave devices and access times associated with each other, is connected to said bus to fetch the slave device to be read from the read command, and refers to said access time table to fetch the predicted access time.

10. The split transaction bus system according to claim 8, wherein said access time prediction circuit is connected to said bus, and receives access time information from the slave device to be read during a cycle immediately after the read command is issued and in which said bus is not occupied.

11. The split transaction bus system according to claim 8, wherein said access time prediction circuit is connected to each of said slave devices via a dedicated line thereof, and continuously receives access time information from the slave device to be read.

12. A split transaction bus system, comprising:

a bus that is a data transfer path for a plurality of devices;

two or more master devices connected to said bus and each having an output terminal for a bus request and an input terminal for a bus grant;

one or more slave devices connected to said bus and each having an output terminal for a bus request and an input terminal for a bus grant;

an access time prediction circuit that predicts an access time required for the data in the slave device to be read to be ready for output when a read command is issued from one of said master devices to one of said slave devices, measures an elapsed time based on a count of clock signals, and sends a parking indication to said slave device to be read during the last cycle before the predicted access time; and an arbiter having an input terminal for the bus request from said master device and said slave device, an output terminal for the bus grant to said master device and said slave device and a connection terminal to said bus, and provided with an arbitration function of selecting the device to which a bus ownership is given in response to the bus request thereof and transmitting the bus grant thereto, and a parking control function of parking said slave device to be read by, if said bus is not being used when said parking indication is received, transmitting the bus grant to said slave device to be read, and if write is being executed, calculating, based on information of the read command and the write command received from said bus, the number of clock cycles required for completing a write process at the time when said predicted access time elapses and the number of clock cycles required for data read from said slave device to be read, and comparing the numbers with each other, and when the former number is equal to or more than the latter number, depriving the master device of the bus ownership and transmitting the bus grant to said slave device to be read, as well as placing said slave device to be read at the highest priority in the arbitration.

13. The split transaction bus system according to claim 12, wherein said access time prediction circuit includes an access time table of the slave devices and access times associated with each other, is connected to said bus to fetch the slave device to be read from the read command, and refers to said access time table to fetch the predicted access time.

14. The split transaction bus system according to claim 12, wherein said access time prediction circuit is connected to said bus, and receives access time information from the slave device to be read during a cycle immediately after the read command is issued and in which said bus is not occupied.

15. The split transaction bus system according to claim 12, wherein said access time prediction circuit is connected to each of said slave devices via a dedicated line thereof, and continuously receives access time information from the slave device to be read.

* * * * *